US007505907B2

(12) United States Patent
Carro

(10) Patent No.: US 7,505,907 B2
(45) Date of Patent: Mar. 17, 2009

(54) SYSTEM AND METHOD FOR ENHANCING LIVE SPEECH WITH INFORMATION ACCESSED FROM THE WORLD WIDE WEB

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 10/528,175

(22) PCT Filed: Jul. 23, 2003

(86) PCT No.: PCT/EP03/09310

§ 371 (c)(1),
(2), (4) Date: Mar. 17, 2005

(87) PCT Pub. No.: WO2004/029831

PCT Pub. Date: Apr. 8, 2004

(65) Prior Publication Data

US 2005/0251394 A1 Nov. 10, 2005

(30) Foreign Application Priority Data

Sep. 27, 2002 (EP) .................................. 02368106

(51) Int. Cl.
*G10L 21/00* (2006.01)
(52) U.S. Cl. ..................... 704/270.1; 704/270; 704/257; 386/96; 725/51
(58) Field of Classification Search .................. 704/270, 704/270.1, 257; 725/51; 386/96
See application file for complete search history.

(56) References Cited

U.S. PATENT DOCUMENTS 5,715,367 A 2/1998 Gillick et al.

5,799,063 A 8/1998 Krane (Continued)

FOREIGN PATENT DOCUMENTS

EP 1 039 400 A 9/2000

OTHER PUBLICATIONS

Coden A R et al.: "Speech transcript analysis for automatic search" Proc. of the 34th Annual Hawaii International Conference on System Sciences, Jan. 3, 2001, pp. 1-9.

(Continued)

*Primary Examiner*—Vijay B Chawan
(74) *Attorney, Agent, or Firm*—Schmeiser, Olsen & Watts; William H. Steinberg

(57) ABSTRACT

The present invention is directed to a system, method and computer program for enabling an auditor of a live speech to access immediately after or at a later time, complementary information related with terms pronounced during this speech. The system associates hyperlinks (i.e., URLs) with selected terms or words likely to be pronounced by the speaker in the course of the speech. A speech recognition system operating on a speaker device (i.e., a computing system a with a microphone connected to it) recognizes during the speech (i.e., word spotting) the pronunciation by the speaker of anyone of said hyperlinked terms, and records the time at which each recognized hyperlinked term has been pronounced. The system is also based on the synchronization of the speaker device with several auditors devices (e.g., workstations, portable computers, personal digital assistants—PDAs, smart phones, or any other type of handheld computing devices) according to a same universal time, so that the flow of information transmitted by the speaker and received by the auditors is always synchronized, independently of the relative positions of the speaker and auditors. Each time the auditor perceives an interesting topic during the speech, he immediately selects the topic simply by pressing a reserved key on the auditor's device. Universal times at which topics are selected by the auditor are stored in the auditor device.

19 Claims, 20 Drawing Sheets

U.S. PATENT DOCUMENTS

| | | | |
|---|---|---|---|
| 5,915,001 | A | 6/1999 | Uppaluru |
| 5,946,653 | A | 8/1999 | Campbell et al. |
| 6,018,710 | A | 1/2000 | Wynblatt et al. |
| 6,157,705 | A | 12/2000 | Perrone |
| 6,224,636 | B1 | 5/2001 | Wegmann et al. |
| 6,249,765 | B1 | 6/2001 | Adler et al. |
| 6,269,335 | B1 | 7/2001 | Ittycheriah et al. |
| 6,282,511 | B1 | 8/2001 | Mayer |
| 6,282,512 | B1 | 8/2001 | Hemphill |
| 6,578,047 | B1 | 6/2003 | Deguchi |
| 6,604,076 | B1 * | 8/2003 | Holley et al. ............. 704/270.1 |
| 2002/0007354 | A1 | 1/2002 | Deguchi |
| 2002/0083060 | A1 * | 6/2002 | Wang et al. .................... 707/10 |
| 2004/0013947 | A1 | 1/2004 | Chang et al. |
| 2004/0133919 | A1 | 7/2004 | Incentis |
| 2004/0139469 | A1 | 7/2004 | Incentis Carro |

OTHER PUBLICATIONS

S.S. Chen et al.: "Recent improvements to IBM's speech recognition system for automatic transcription of broadcast news" IBM Thomas J. Watson Research Center, 4 pgs.

Stephen Cook "Speech Recognition HOWTO" 15 pgs.

IBM Embedded ViaVoice Multiplatform Edition, 1 pg.

IBM Embedded ViaVoice Mobility Suite, 1 pg.

Eddie Epstein—IBM Pervasive Computing, Nov. 2002 "Extending an Enterprise with IBM WebSphere Voice Application Access" 12 pgs.

Voice Recognition Software, 4 pgs.

Neti et al. "Large-Vocabulary Audio-Visual Speech Recognition: A Summary of the Johns Hopkins Summer 2000 Workshop" Oct. 3-5, 2001, 6 pgs.

IBM Embedded Via Voice Enterprise Edition, 1 pg.

Pervasive and Embedded Development—a new development environment for the enterprise, 4 pgs.

W3 Offering Information IBM United States Software Announcement 201-146 May 9, 2001, IBM WebSphere Voice Server Version 1.5 Delivers Breakthrough Voice Technology for e-business; now in U.S. and U.K. English, French, and German, 12 pgs.

IBM Patents in Speech Recognition and Synthesis Over 200 speech patents are at the heart of IBM speech technology, 16 pgs.

* cited by examiner

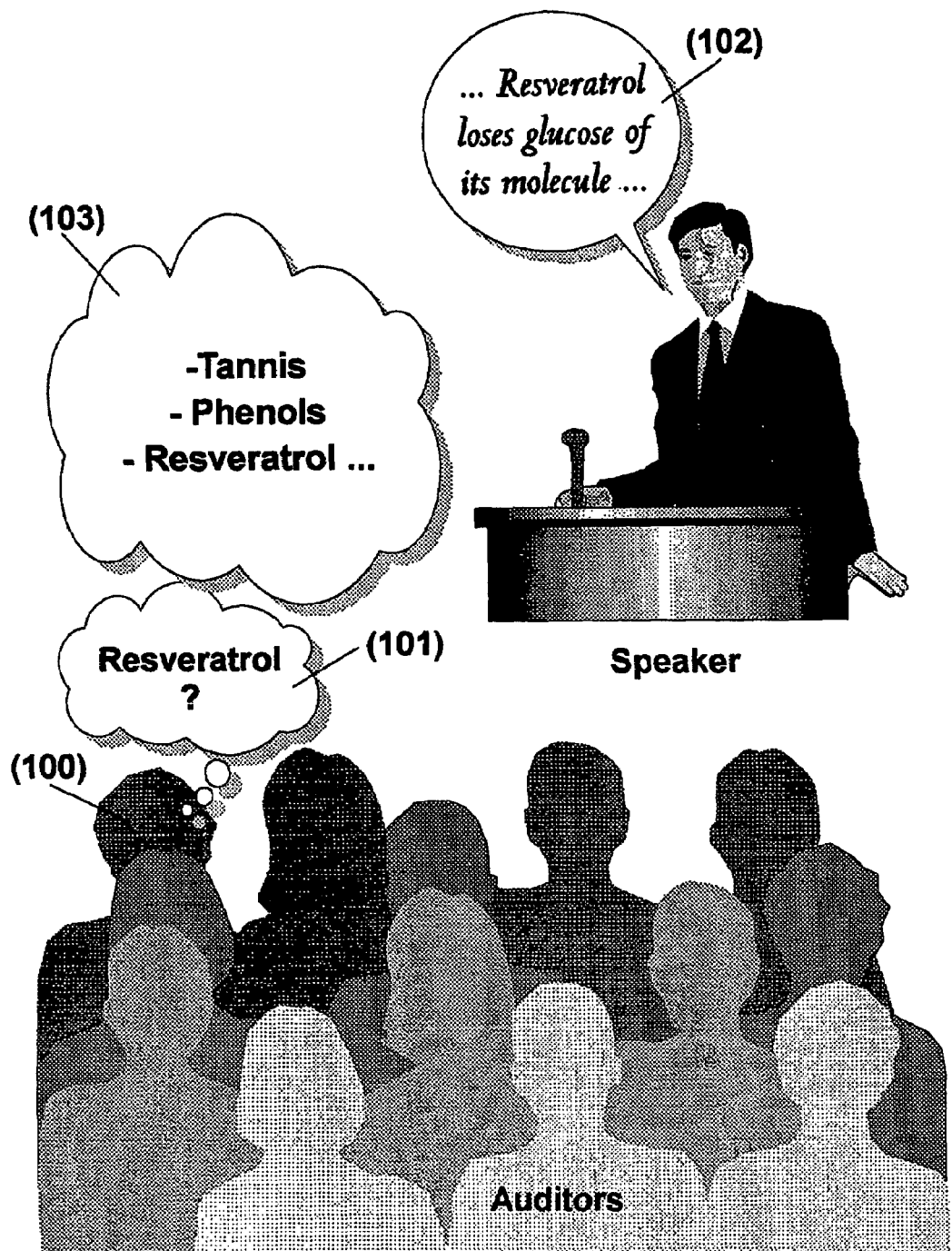
Fig. 1: During a speech auditors perceive interesting topics

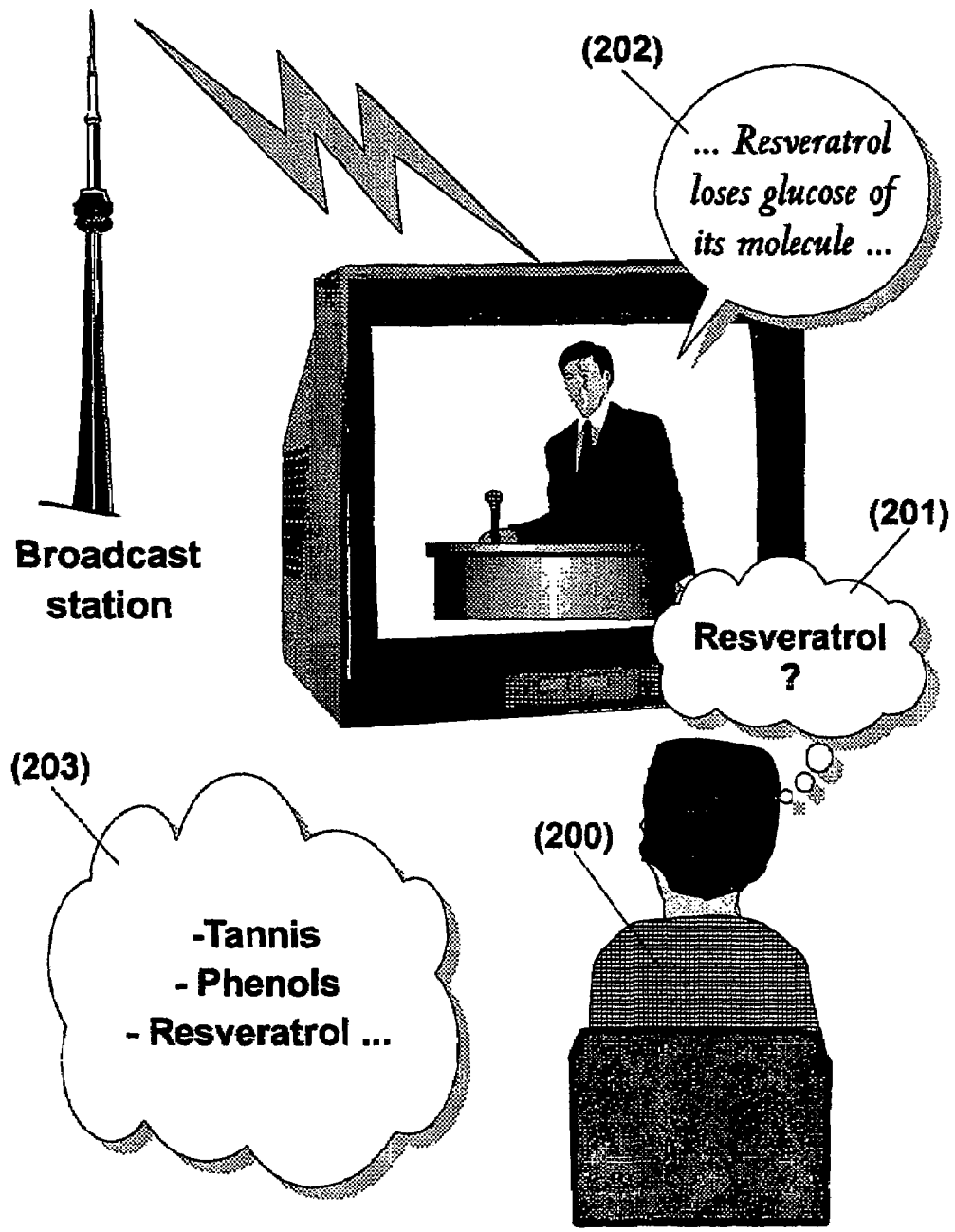
Fig. 2: During a radio or television program an auditor perceives interesting topics

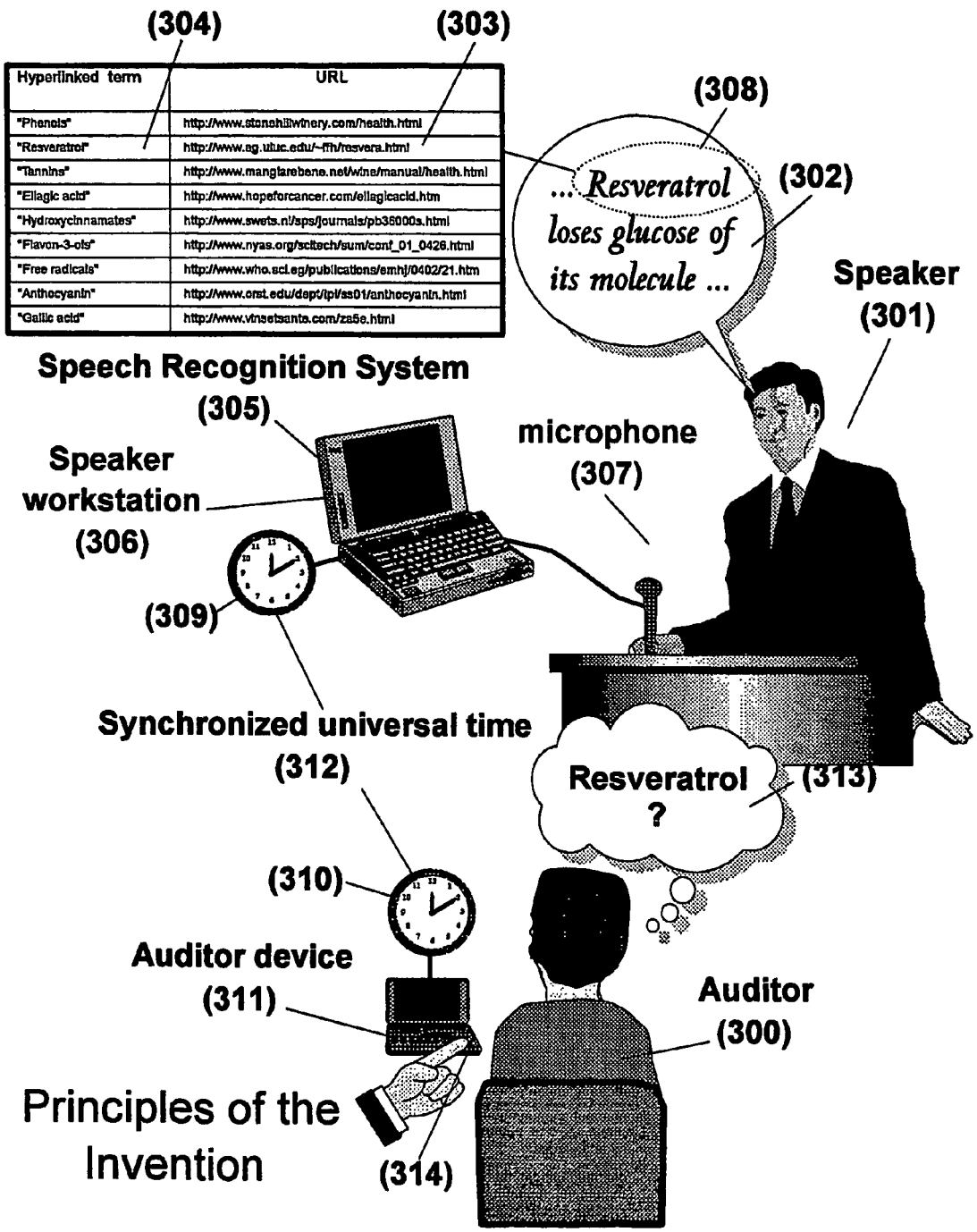
Fig. 3: The speaker workstation and auditors devices are synchronized. Hyperlinked terms pronounced by the speaker are automatically recognized during the speech (400)

...
The concentration and molecular structure of the phenols changes as grapes are processed into wine, and as new wine ages into old wine. Oxidation (the addition of an oxygen atom to a molecule) takes place, and the resulting molecules further interact with each other. Resveratrol loses glucose of its molecule. The oak barrel tannins break down and release ellagic acid. After a few months, the hydroxycinnamates begin to break down. The "flavon-3-ols from bonds with other molecules and change into a form that is not found in the fresh grape.

The good news about all these chemical changes is that as wine ages, the number of anti-oxidizing molecules in it actually increases. Anti-oxidants purge the body of free radicals and are good for us.

The bad news is that, despite the increase in the number of anti-oxidizing molecules over time, their bioavailability decreases. The anti-oxidizing molecules that are formed during aging are much larger than the original phenols, and thus are not well absorbed in the alimentary canal. After one or two years of aging, the amount of anthocyanin has decreased to about one-sixth of the original level. After five to ten years, wine has lost most of the smaller, and presumably health friendly, phenols. "When we look at very old wine, the only component that stands out is gallic acid".

So, ironically, a $7 bottle of 3-year old wine is a healthier drink than a $600 bottle of 25-year old wine. (Of course, it may not taste as good!).
...

*Aged Wine Loses Its Vitality.* by: Andrew L. Waterhouse, Ph.D. Dep.of Viticulture and Enology at the University of California at Davis Conference on Alcohol and Wine in Health and Disease, New York Academy of Sciences, April 26-29, 2001
http://www.nyas.org/scitech/sum/conf_01_0426.html#13

Fig. 4: The speaker prepares the speech text

(500)

(501)

...

The concentration and molecular structure of the phenols changes as grapes are processed into wine, and as new wine ages into old wine. Oxidation (the addition of an oxygen atom to a molecule) takes place, and the resulting molecules further interact with each other. Resveratrol loses glucose of its molecule. The oak barrel tannins break down and release ellagic acid. After a few months, the hydroxycinnamates begin to break down. The flavon-3-ols from bonds with other molecules and change into a form that is not found in the fresh grape.

The good news about all these chemical changes is that as wine ages, the number of anti-oxidizing molecules in it actually increases. Anti-oxidants purge the body of free radicals and are good for us.

The bad news is that, despite the increase in the number of anti-oxidizing molecules over time, their bioavailability decreases. The anti-oxidizing molecules that are formed during aging are much larger than the original phenols, and thus are not well absorbed in the alimentary canal. After one or two years of aging, the amount of anthocyanin has decreased to about one-sixth of the original level. After five to ten years, wine has lost most of the smaller, and presumably health friendly, phenols. "When we look at very old wine, the only component that stands out is gallic acid".

So, ironically, a $7 bottle of 3-year old wine is a healthier drink than a $600 bottle of 25-year old wine. (Of course, it may not taste as good!).

...

*Aged Wine Loses Its Vitality*. by: Andrew L. Waterhouse, Ph.D. Dep.of Viticulture and Enology at the University of California at Davis Conference on Alcohol and Wine in Health and Disease, New York Academy of Sciences, April 26-29, 2001 http://www.nyas.org/scitech/sum/conf_01_0426.html#13

Fig. 5: The speaker selects hyperlinked terms in the text

Speech Hyperlink Table (600)

| Hyperlinked term | URL |
|---|---|
| "Phenols" | http://www.stonehillwinery.com/health.html |
| "Resveratrol" | http://www.ag.uiuc.edu/~ffh/resvera.html |
| "Tannins" | http://www.mangiarebene.net/wine/manual/health.html |
| "Ellagic acid" | http://www.hopeforcancer.com/ellagicacid.htm |
| "Hydroxycinnamates" | http://www.swets.nl/sps/journals/pb36000s.html |
| "Flavon-3-ols" | http://www.nyas.org/scitech/sum/conf_01_0426.html |
| "Free radicals" | http://www.who.sci.eg/publications/emhj/0402/21.htm |
| "Anthocyanin" | http://www.orst.edu/dept/lpi/ss01/anthocyanin.html |
| "Gallic acid" | http://www.vinsetsante.com/za5e.html |

(601)  (602)

Fig. 6: The speaker creates a Speech Hyperlink Table and associates an address with each hyperlinked term

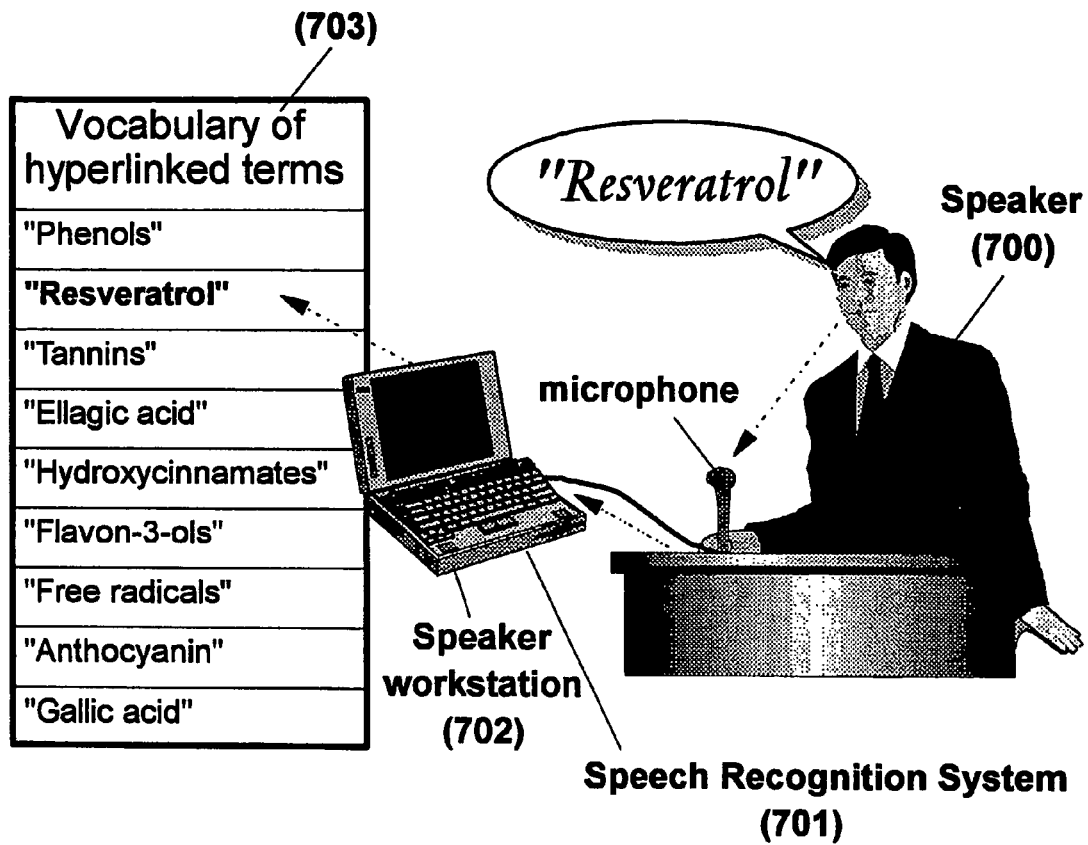
Fig. 7: The speaker trains the Speech Recognition System to recognize hyperlinked terms

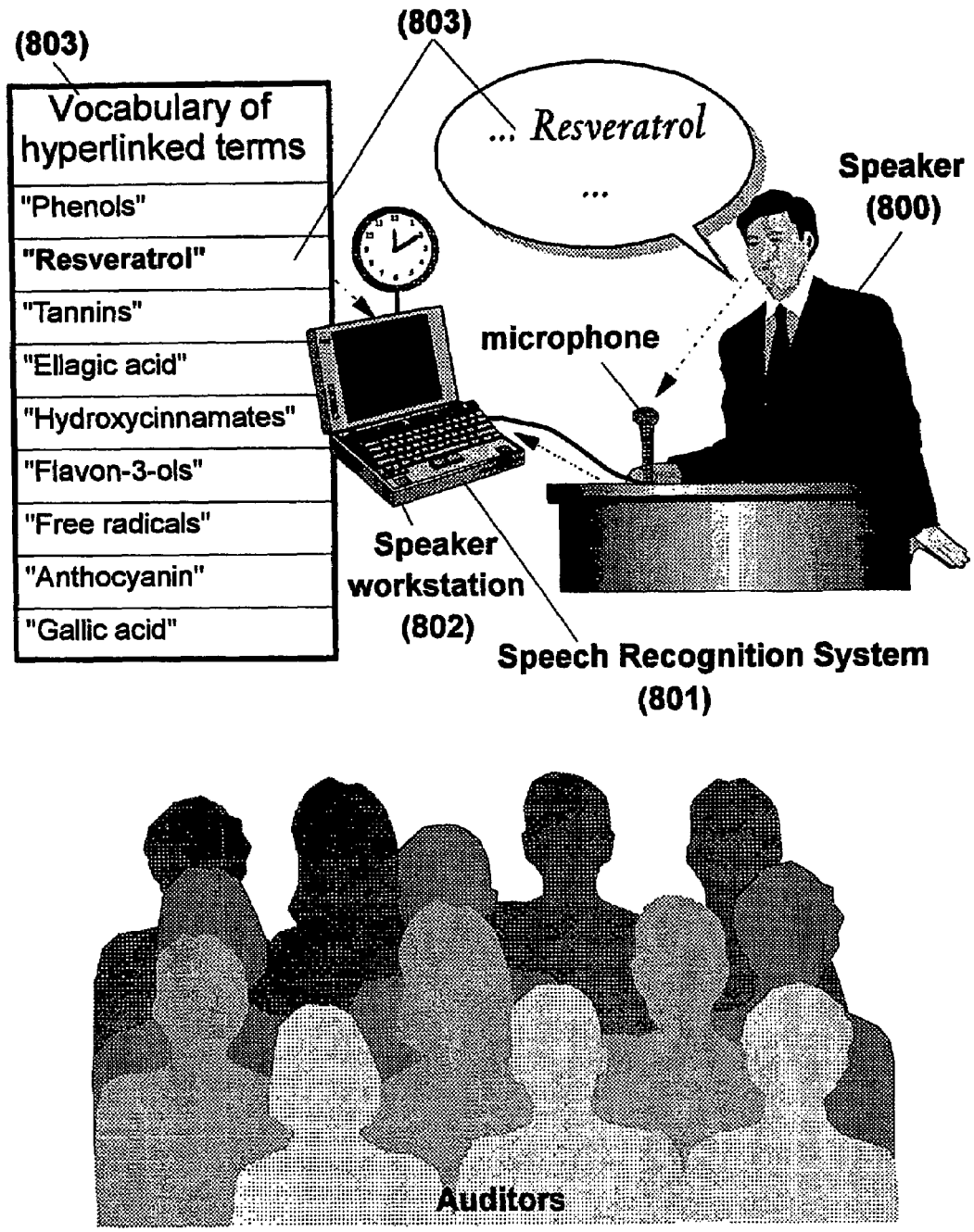
Fig. 8: During the speech, the Speech Recognition System recognizes hyperlinked terms pronounced by the speaker

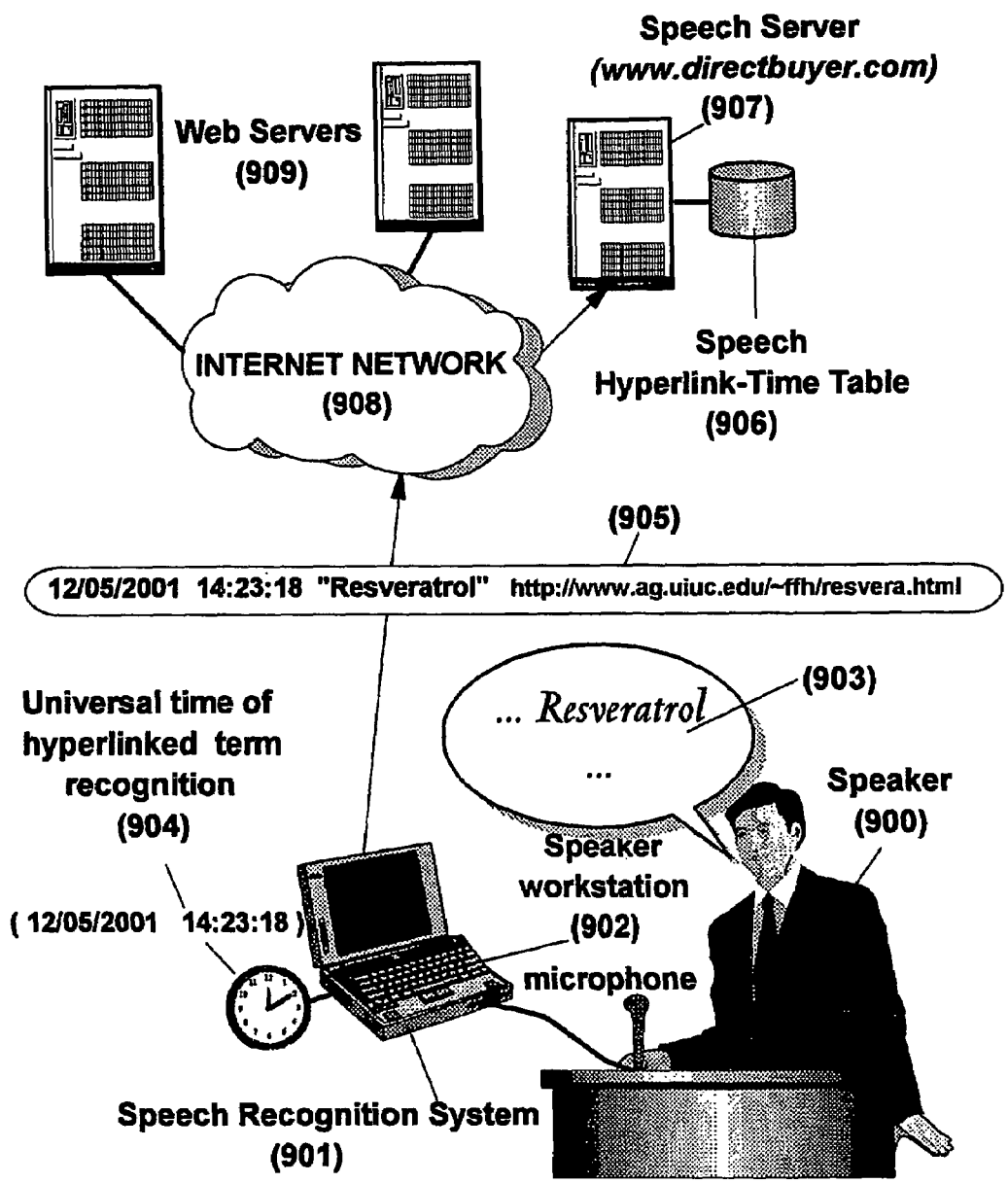
Fig. 9: Hyperlinked terms and associated addresses and universal times are recorded on a Speech Hyperlink-Time Table on a Speech Server

Speech Hyperlink-Time Table

| SPEECH TITLE: Wine & Health | SPEAKER: Louis Durand | SPEECH HYPERLINK-TIMETABLE URL: http://www.directbuyer.com/conference-0173.htm/ |
|---|---|---|
| RECOGNITION TIME | HYPERLINKED TERM | HYPERLINK URL |
| 12/05/2001 14:22:52 | Phenols | http://www.stonehillwinery.com/health.html |
| 12/05/2001 14:23:12 | Resveratrol | http://www.ag.uiuc.edu/~ffh/resvera.html |
| 12/05/2001 14:23:25 | Tannins | http://www.mangiarebene.net/wine/manual/health.html |
| 12/05/2001 14:23:39 | Ellagic acid | http://www.hopeforcancer.com/ellagicacid.htm |
| 12/05/2001 14:23:57 | Hydroxycinnamates | http://www.swets.nl/sps/journals/pb36000s.html |
| 12/05/2001 14:24:11 | Flavon-3-ols | http://www.nyas.org/scitech/sum/conf_01_0426.html |
| 12/05/2001 14:24:35 | Free radicals | http://www.who.sci.eg/publications/emhj/0402/21.htm |
| 12/05/2001 14:24:49 | Anthocyanin | http://www.orst.edu/dept/lpi/ss01/anthocyanin.html |
| 12/05/2001 14:25:08 | Gallic acid | http://www.vinsetsante.com/za5e.html |
|  |  |  |
|  |  |  |
|  |  |  |
|  |  |  |

Fig. 10: Example of Speech Hyperlink-Time Table stored on the Speech Server

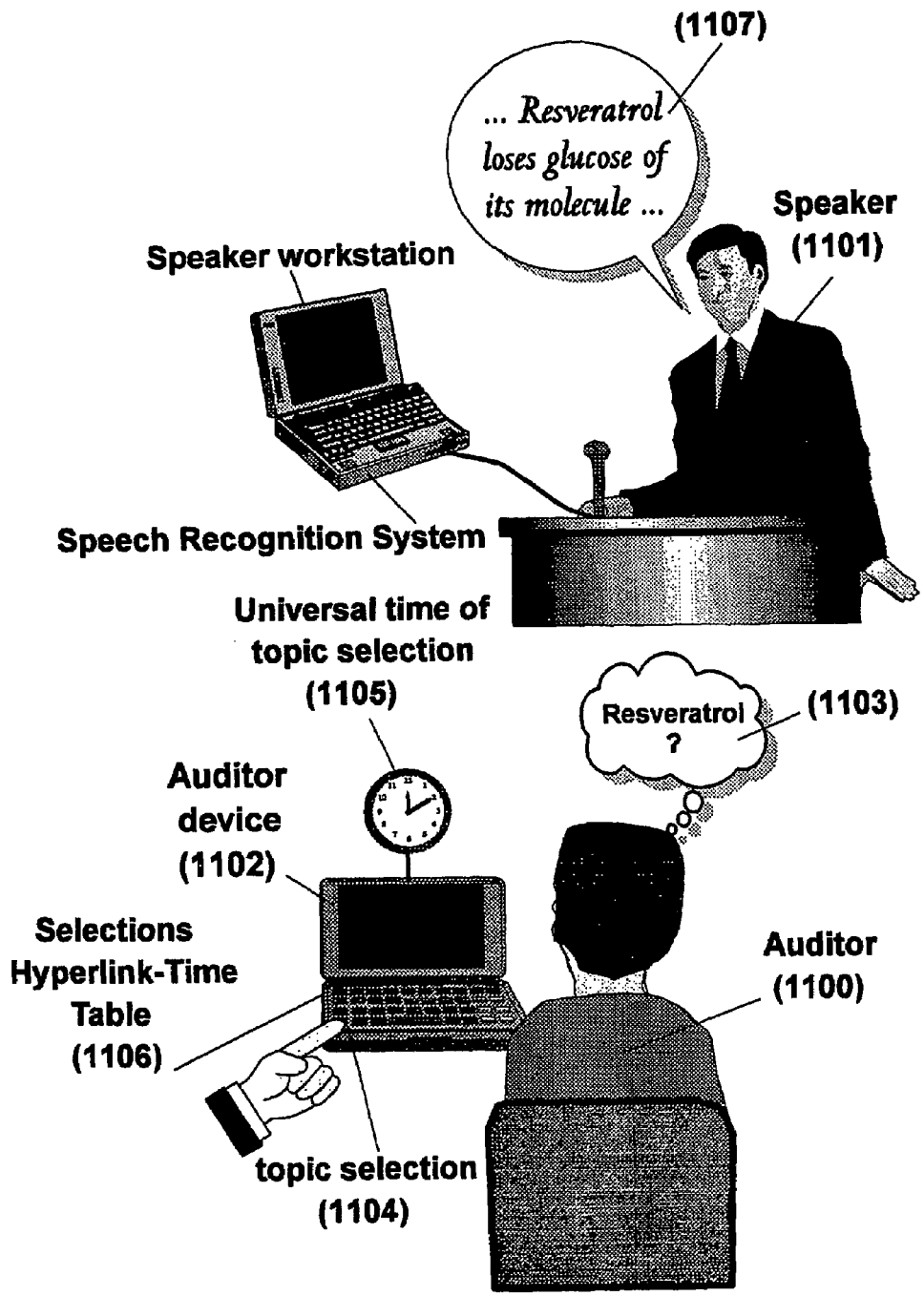
Fig. 11: During the speech, the auditor selects interesting hyperlinked terms by pressing a reserved key on the auditor device (1202) Selections Hyperlink-Time Table (1201)

| SPEECH TITLE: Wine & Health | SPEAKER: Louis Durand | SPEECH HYPERLINK-TIMETABLE URL: http://www.directbuyer.com/conference-0173.htm/ |
|---|---|---|
| SELECTION TIME | HYPERLINK | HYPERLINK URL |
| 12/05/2001 14:23:14 | | |
| 12/05/2001 14:23:42 | | |
| 12/05/2001 14:24:52 | | |
| | | |
| | | |
| | | |
| | | |
| | | |
| | | |
| | | |
| | | |
| | | |
| | | |

(1200)

Fig. 12: Universal times corresponding to the selection of terms by the auditor are stored in a Selections Hyperlink-Time Table on the auditor device

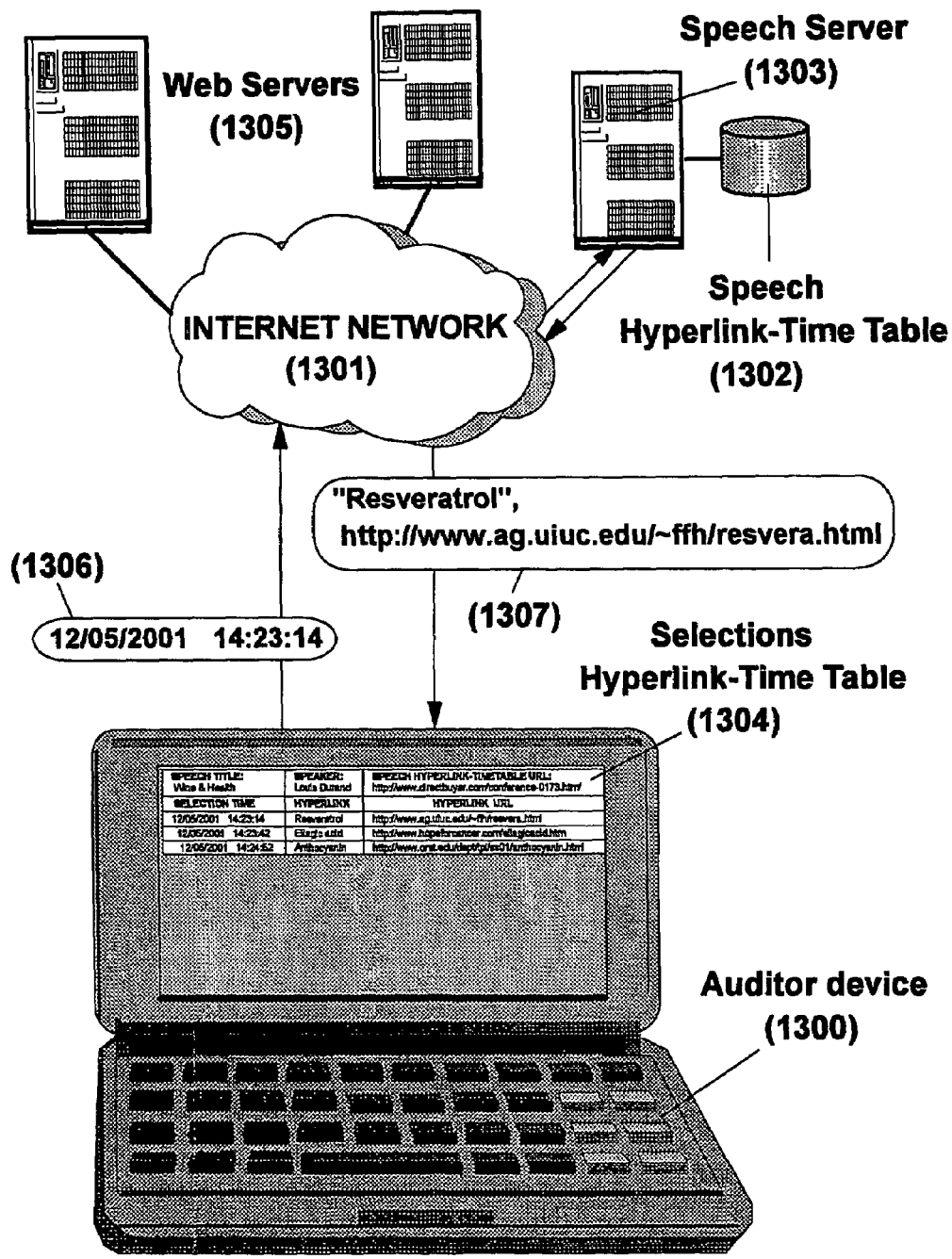
Fig. 13: The auditor updates the Selections Hyperlink-Time Table from the Speech Hyperlink-Time Table stored on the Speech Server

| SPEECH TITLE:<br>Wine & Health | SPEAKER:<br>Louis Durand | SPEECH HYPERLINK-TIMETABLE URL:<br>http://www.directbuyer.com/conference-0173.htm/ |
|---|---|---|
| SELECTION TIME | HYPERLINK | HYPERLINK URL |
| 12/05/2001 14:23:14 | | |
| 12/05/2001 14:23:42 | | |
| 12/05/2001 14:24:52 | | |

(1403)

(1400)

| SPEECH TITLE:<br>Wine & Health | SPEAKER:<br>Louis Durand | SPEECH HYPERLINK-TIMETABLE URL:<br>http://www.directbuyer.com/conference-0173.htm/ |
|---|---|---|
| RECOGNITION TIME | HYPERLINKED TERM | HYPERLINK URL |
| 12/05/2001 14:22:52 | Phenols | http://www.stonehillwinery.com/health.html |
| 12/05/2001 14:23:12 | Resveratrol | http://www.ag.uiuc.edu/~ffh/resvera.html |
| 12/05/2001 14:23:25 | Tannins | http://www.manglarebene.net/wine/manual/health.html |
| 12/05/2001 14:23:39 | Ellagic acid | http://www.hopeforcancer.com/ellagicacid.htm |
| 12/05/2001 14:23:57 | Hydroxycinnamates | http://www.swets.nl/sps/journals/pb35000s.html |
| 12/05/2001 14:24:11 | Flavon-3-ols | http://www.nyas.org/scitech/sum/conf_01_0426.html |
| 12/05/2001 14:24:35 | Free radicals | http://www.who.sci.eg/publications/emhj/0402/21.htm |
| 12/05/2001 14:24:49 | Anthocyanin | http://www.orst.edu/dept/lpi/ss01/anthocyanin.html |
| 12/05/2001 14:25:08 | Gallic acid | http://www.vinsetsante.com/za5e.html |
| | | |

(1401)

| SPEECH TITLE:<br>Wine & Health | SPEAKER:<br>Louis Durand | SPEECH HYPERLINK-TIMETABLE URL:<br>http://www.directbuyer.com/conference-0173.htm/ |
|---|---|---|
| SELECTION TIME | HYPERLINK | HYPERLINK URL |
| 12/05/2001 14:23:14 | Resveratrol | http://www.ag.uiuc.edu/~ffh/resvera.html |
| 12/05/2001 14:23:42 | Ellagic acid | http://www.hopeforcancer.com/ellagicacid.htm |
| 12/05/2001 14:24:52 | Anthocyanin | http://www.orst.edu/dept/lpi/ss01/anthocyanin.html |

(1402)

Fig. 14: Hyperlinked terms selected by the auditor are identified and copied from the Speech Hyperlink-Time Table into the Selections Hyperlink-Time Table

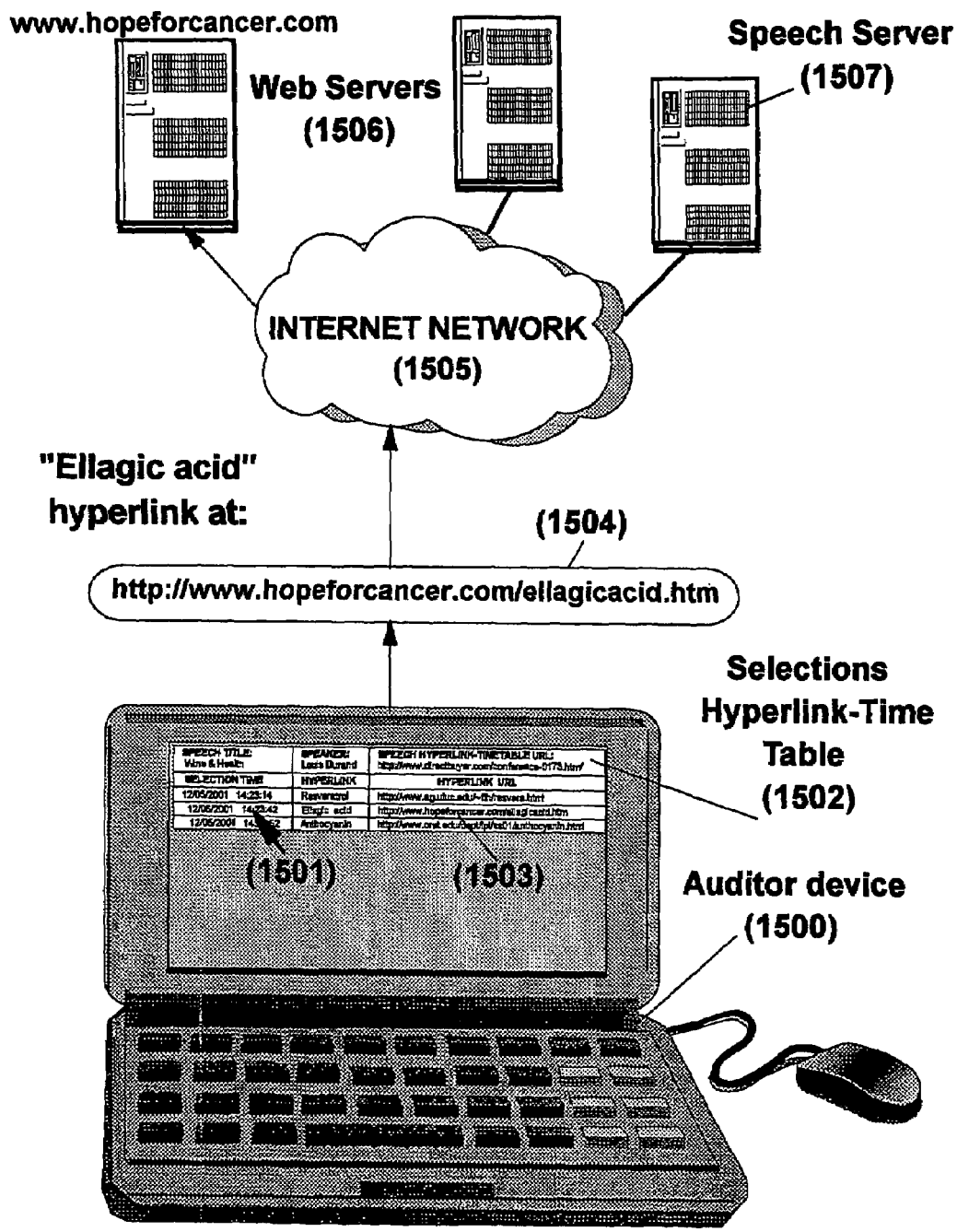
Fig. 15: Hyperlinks are triggered using the Selections Hyperlink-Time Table

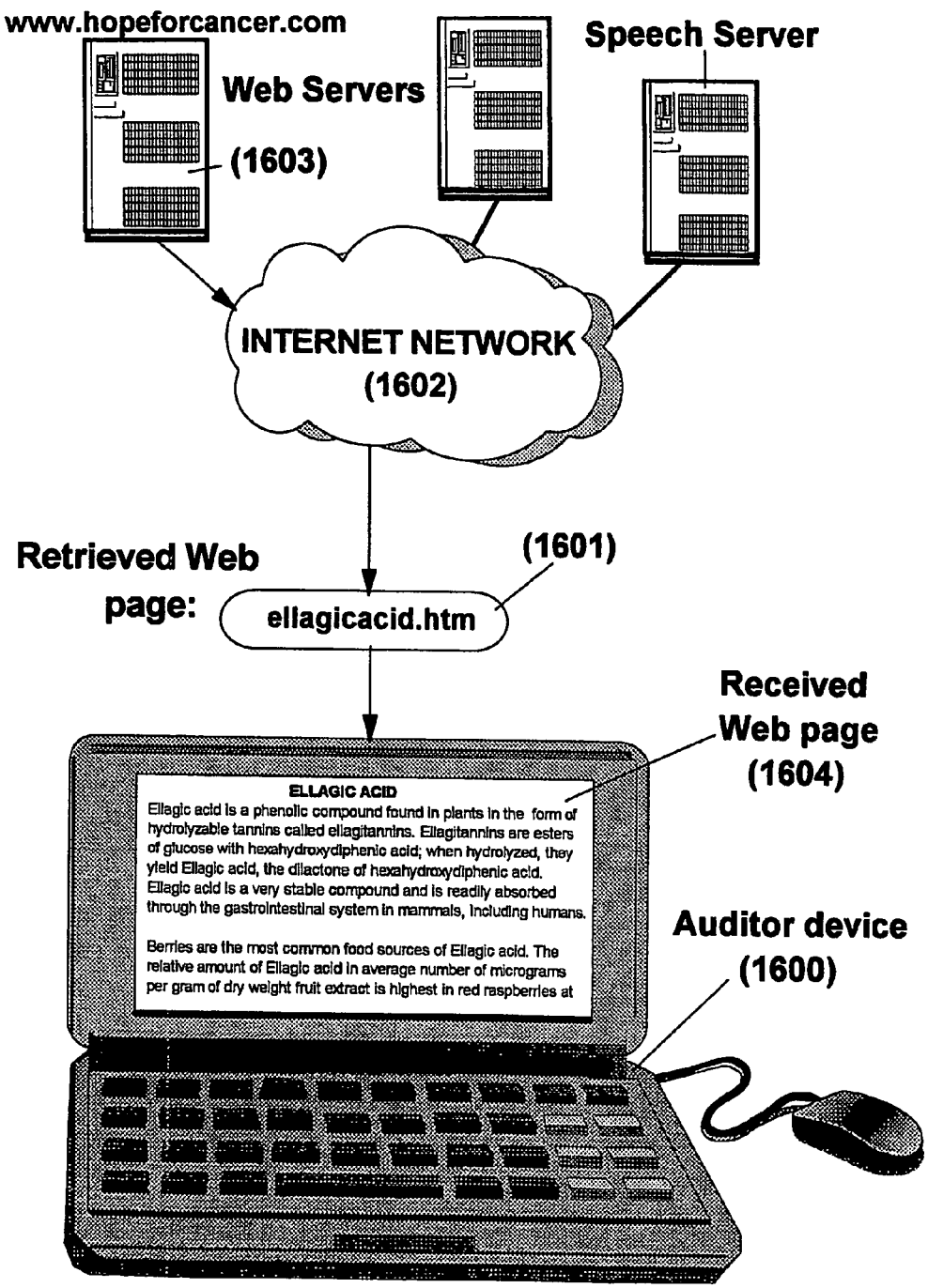
Fig. 16: The Web page related to the selected term is received from the Web server and displayed on the auditor device

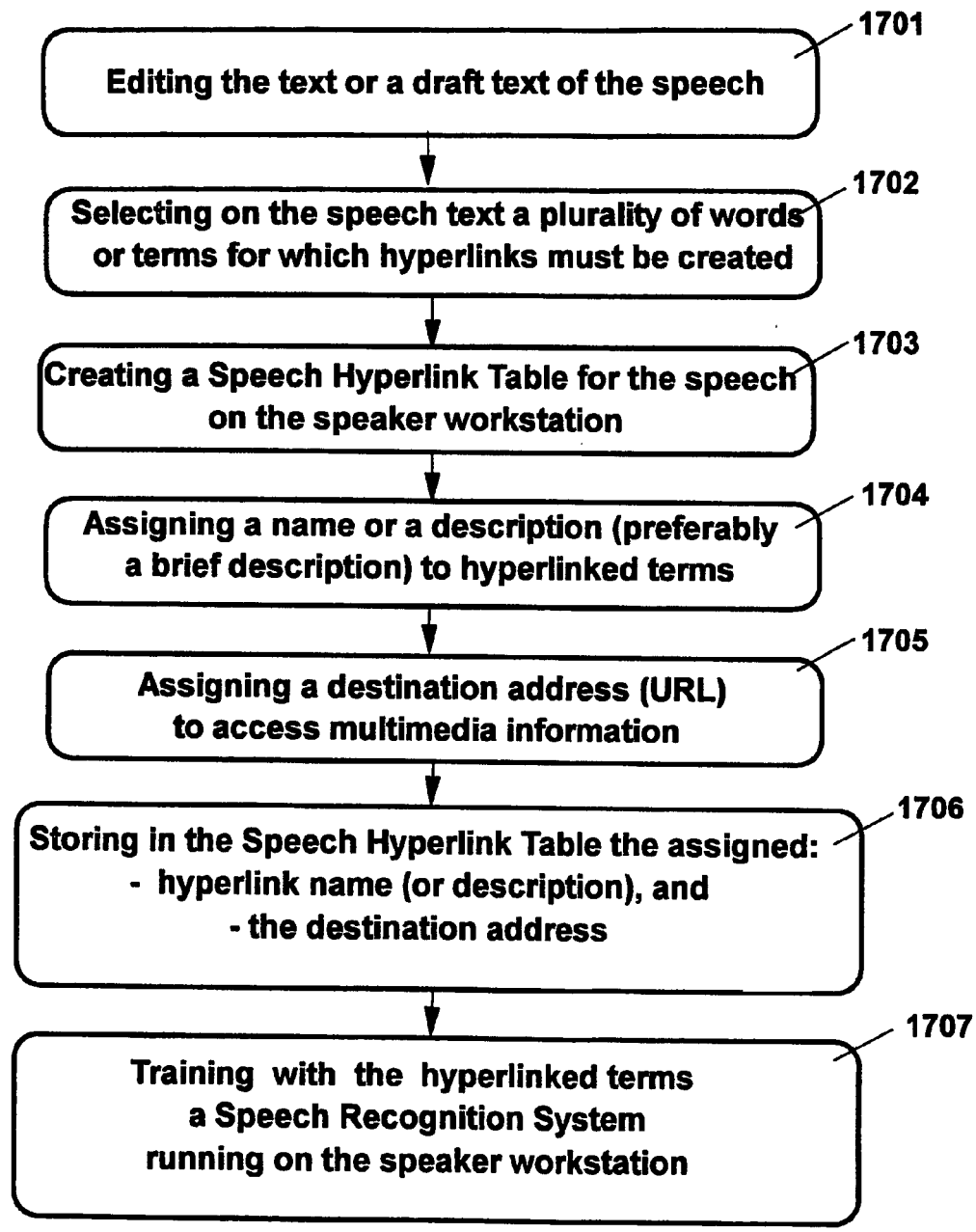
Fig. 17: Method for creating a Speech Hyperlink Table for a speech and for training a Speech Recognition System with hyperlinked terms

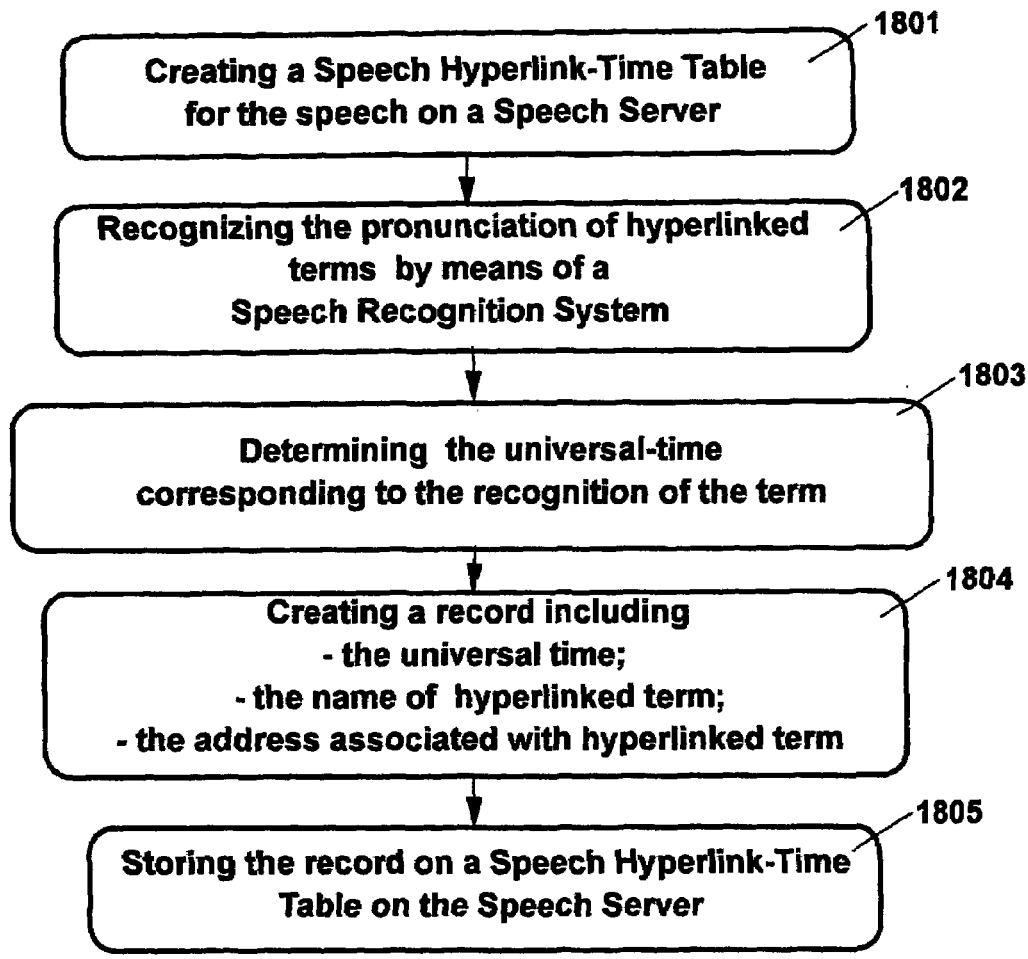
Fig. 18: Method for creating a Speech Hyperlink-Time Table on a Speech Server and for recognizing the pronunciation of hyperlinked terms during a speech

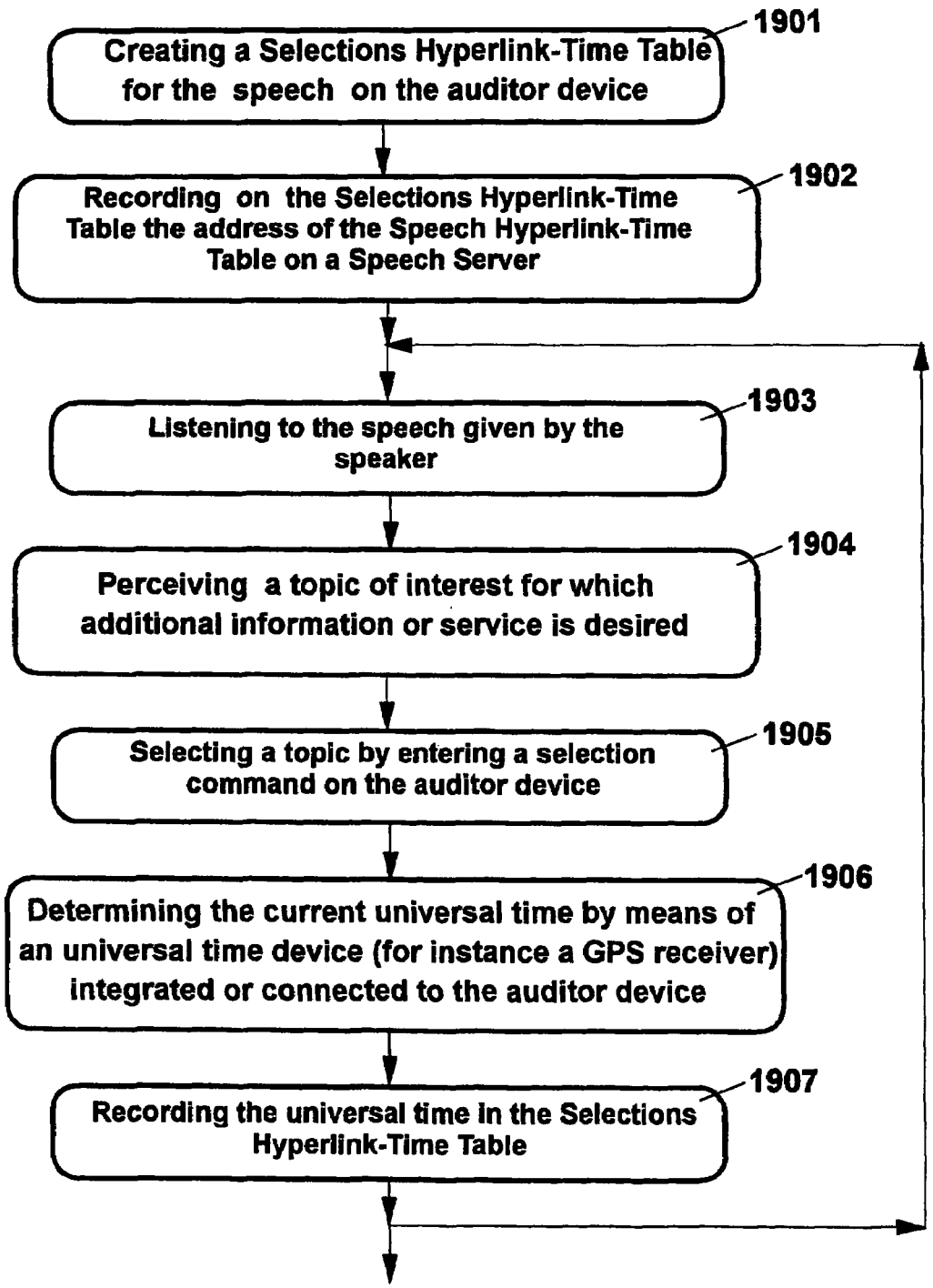
Fig. 19: Method for creating a Selections Hyperlink-Time Table and for selecting topics of interest in a speech

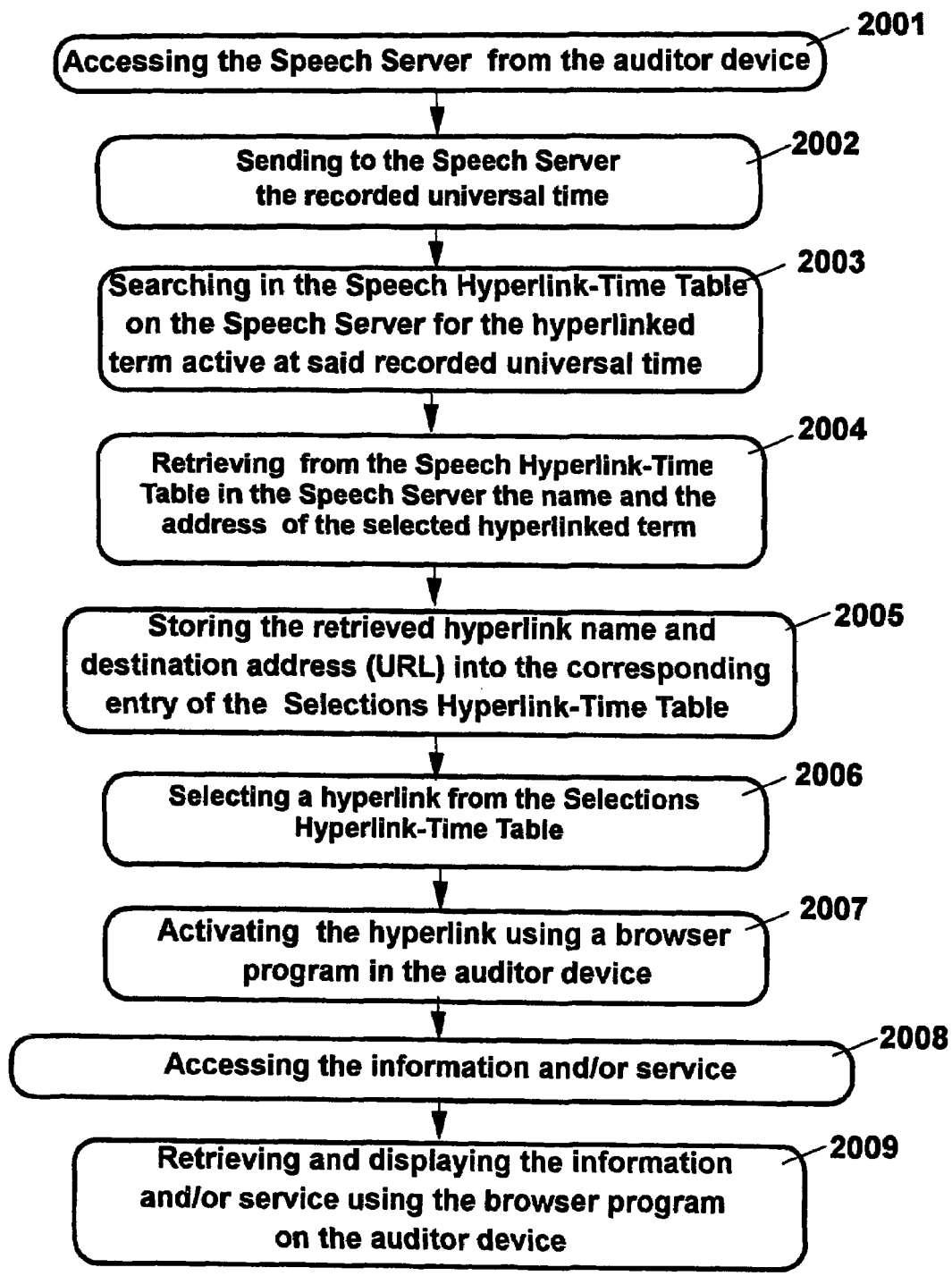
Fig. 20 : Method for accessing information related to selected terms

SYSTEM AND METHOD FOR ENHANCING LIVE SPEECH WITH INFORMATION ACCESSED FROM THE WORLD WIDE WEB

FIELD OF THE INVENTION

The present invention relates generally to techniques for integrating in a live event, means for accessing complementary information, and more particularly to systems and methods for enhancing a live event, such as a live speech or a live broadcast program, with information, in particular with information that can be accessed from the World Wide Web.

BACKGROUND OF THE INVENTION

Need for Information

In our society, people have a growing need for information and services. Most spectators attending to a live event (e.g., as auditors of a conference given by a speaker), or auditors attending to a live radio or television broadcast program, want to have access to complementary information. This complementary information may consist in the biography of a player of a football match, the historical background on events cited on a news program, or athletic records during the transmission of an Olympic competition.

In fact, today people are looking for more information about what they are hearing or listening locally, as spectators of live events, or remotely, as auditors of live broadcast programs:

- Consumers want to have access to special services associated with advertised products.
- Media providers expect new sources of profit by extending the quantity and quality of services and information provided to consumers and more particularly to auditors of live television or radio programs.
- Advertisers are looking for new and more effective forms of advertisement.

On-Line Services on the Web

Independently of the massive development of radio and television, on-line services such as those provided on the World Wide Web (i.e., the Web), have rapidly emerged in our society and are now widely available. Such on-line services based on the Internet technology, provide access to a huge amount of information on an interactive basis. The Internet is a global network of computers. The Internet connects computers based on a variety of different operating systems or languages using a language referred to as TCP/IP ("Transmission Control Protocol/Internet Protocol"). With the increasing size and complexity of the Internet, tools have been developed to help users to find information they need on the network. These tools are often called "navigators" or "navigation systems". The World Wide Web ("WWW" or "the Web") is a recent superior navigation system. The Web is:

- an Internet-based navigation system,
- an information distribution and management system for the Internet, and
- a dynamic format for communicating on the Web.

Internet and the Web is transforming our society by offering to millions of users, the opportunity to access and exchange information and to communicate between each other. By integrating images, text, audio and video, a user on the Web using a graphical user interface can today transparently communicate with different computers on the system, different system applications, and different information formats for files and documents including, for example, text, sound and graphics. Currently, on-line systems on the Web offer a variety of different services to users, for instance, private message services, electronic commerce, news, real-time games, access to electronic databases, electronic newsletters, business-to-business transactions, or job placement services.

But, even if such on-line services are now available, the searching and finding of the relevant information on the Web remains an arduous task, sometimes taking hours, even for experienced users. Obviously, since the Web is essentially an open, multi-point to multi-point network, each user can select and retrieve different information from many different servers. In fact, today, most on-line interactions with the Web occur merely through textual inputs for instance by entering URLs (Uniform Resource Locator) names, by entering key words on search tools, or by activating textual hyperlinks on HTML (Hypertext Markup Language) documents. Even if in a near future, the development of audiovisual interfaces (e.g., human speech interfaces, Web-phone integration) will render textual inputs less and less dominant in on-line environments, there is a good chance that the Web remains user unfriendly due to its massiveness, its lack of organization, and its randomness. Simply stated, in the Web, there is no order or direction. Information remains most of the time hard to find and even worse, in a foreseeable future, it will remain a difficult task to find the required information into the desired context.

On-Line Services from Live Speech

Unlike the multi-point to multi-point Web network, a live speech to an audience (the audience being in the same location as the speaker or the audience being remotely located, i.e., accessed through a radio or television broadcast station) is primarily a communication from a single emitter to multiple receivers. Every auditor receives the same content, locally from the speaker, or remotely through the broadcasting station.

Thus, to provide on-line services similar to those that can be accessed on the Web, a first problem in a live speech is that the information flows continuously in the same direction, from a single source to multiple receivers, from a provider to multiple auditors. The communication flow is limited to one direction without any exchange of information with the auditors. People cannot directly interact with the oral information that is received, to access additional information or services.

Moreover, when people hear a live speech, a problem for the auditors is to select topics of interest and then to identify the network addresses (i.e., URLs) to access (e.g., from the Web) the multimedia information or services related with the selected topics. Until today, this problem has been partially solved.

To provide web-like capabilities to the oral or radio information, a solution is to embed information (e.g., URLs) into the transmitted broadcast audio signals or on separate channels (simulcast). Examples of such systems are described in the following patents: U.S. Pat. No. 6,125,172 entitled "Apparatus and method for initiating a transaction having acoustic data receiver that filters human voice", U.S. Pat. No. 6,098,106 entitled "Method for controlling a computer with an audio signal", U.S. Pat. No. 5,841,978 entitled "Network linking method using steganographically embedded data objects", U.S. Pat. No. 5,832,223 entitled "System, method and device for automatic capture of Internet access information in a broadcast signal for use by an Internet access device", U.S. Pat. No. 5,761,606, entitled "Media online services access via address embedded in video or audio program", U.S. Pat. No. 5,189,630 entitled "Method for encoding and broadcasting information about live events using computer pattern matching techniques", U.S. Pat. No. 5,119,507 entitled "Receiver apparatus and methods for identifying broadcast audio program selections in a radio broadcast system" or U.S. Pat. No. 6,061,719 entitled "Synchronized presentation of television programming and web content".

The systems and methods described in these patents require the transmission of a complementary information (e.g., URLs) encoded, embedded or modulated on the same audio or video signal or transmitted on a separate channel, concurrently with the transmission of the main program. Radio or television stations must comprise means for encoding, modulating and transmitting along with the audio signal this complementary information. The radio auditors or television viewers must be equipped with special receivers and decoder circuits for recovering this information.

Independently of the herein above discussed arrangements, systems have been developed to enable auditors to "pre-select" topics of interest (i.e., keywords or sentences) and to associate these topics with pre-specified network addresses (i.e., URLs). These pre-specified network addresses are used to access multimedia information or services related with the pre-selected topics. In general terms, all these system are based on speech recognition techniques. These techniques are used to identify keywords (i.e., selected words or sentences) for performing specific actions in response to the recognition of specific sounds. Examples of these systems can be found in the following patents:

U.S. Pat. No. 5,946,050 entitled "Keyword listening device" discloses a method and a system for monitoring the audio portion of a broadcast signal by means of a keyword listening. device, where a relatively limited set of keywords are stored. The keyword listening device monitors the broadcast signal for any of these keywords. Upon recognition of any one or more of the keywords, the broadcast audio signal is recorded for a period of time and then fully analyzed. After analysis, and in dependence upon the recorded and analyzed broadcast audio signal, a number of different functions, such as connection to an external network at a specified address, or control of a video cassette recorder, may be performed.

U.S. Pat. No. 6,011,854 entitled "Automatic recognition of audio information in a broadcast program" discloses an audio processing system to search for information reports or updates (such as traffic, weather, time, sports, news, and the like) broadcast over one or several radio stations. The search is based on at least one keyword (such as "traffic", "weather", "time", "sports", "news" depending on the desired report) pre selected by the user, and entered into the audio processing system. While speech recognition software used by the audio processing system scans the radio station for the requested information report, the user may listen to other audio sources (a CD, a tape, another radio station broadcast, etc.) without being required to monitor (that is, listen to) the information content from those audio sources. Once the requested information report is detected based on the entered keyword used in the radio broadcast, the audio processing system switches its audio output to the radio station transmitting the desired broadcast, so that the user can timely and conveniently listen to the traffic, weather, time, sports, and/or news reports or updates.

U.S. Pat. No. 6,332,120 entitled "Broadcast speech recognition system for keyword monitoring" discloses a system where broadcast audio is automatically monitored for information of interest. This system comprises a computer processor with a memory for storing a vocabulary of keywords of interest, an audio receiver for receiving an audio broadcast and a speech recognition system, associated with the audio receiver and the computer processor, for detecting when one of the keywords appears in a received audio segment. A report generator associated with the computer processor and responsive to the detection of a keyword, generates a report with details related to the detected keyword and its context.

Even if the systems previously mentioned don't require the transmission of complementary information embedded with the audio signal (or on a secondary signal concurrently with the retransmission of the main program), the auditors must be equipped with receivers with speech recognition capabilities to detect the occurrence of hyperlinked terms in the data stream.

In the field of speech processing, the ability to identify occurrences of words or sentences in a stream of voice data is commonly called "word spotting". The goal of audio word-spotting is to identify the boundaries of a search term within a digitized continuous speech stream without prior manual transcription. Searching and indexing a live speech that may be pronounced by any speaker, is particularly problematic. This is due in large part, to the limited capabilities of the existing automatic speech recognition technology. It is important to note that in the above discussed systems, the word spotting task is done on the auditor side, in a speaker independent manner, with unrestricted vocabulary, and employ speech models trained using voice data other than the data to recognize.

In fact, a fundamental problem with all systems, is the unreliable behavior of the state-of-the-art speech recognition technology for performing "word spotting" (i.e., identification of pre-specified keywords or terms) on a continuous manner, independently to the speaker, based on unknown or generic speaking styles, vocabularies, noise levels and language models.

As shown in the foregoing discussion, even if during these last years, interactive systems have been developed for increasing and improving the level of interaction with users and for providing more information and more learning or entertainment opportunities (e.g., interactive television, WebTV), important sources of information, such as those that can be found in the Web, still remain inaccessible for auditors of a live speech (e.g., a live conference or a live interview received from a radio or television broadcast).

Therefore, today there is a need to provide a convenient, universal, and easy mechanism for enabling people attending a live speech (e.g., or receiving a live broadcast program) to select and access complementary information.

There is also a need for speakers and producers of live broadcast programs to create hyperlinks from selected terms (generally selected spoken utterances, words or sentences) intended to be pronounced during a speech (e.g., on the course of a conference or during a live radio or television program), to relevant data on the Web without embedding these hyperlinks in conventional one-way broadcast signals, and more generally without physically transmitting these hyperlinks and without modifying conventional transmitters or receivers.

OBJECTS OF THE INVENTION

It is a broad object of the invention to enhance audio information such as a live speech or a live radio or television broadcast program, with complementary information or services related to this audio information.

It is another object of the invention to create hyperlinks between selected terms or words intended to be pronounced by a speaker in the course of a speech and complementary information related to these selected terms.

It is another object of the invention to identify hyperlinked terms as they are pronounced by a speaker in the course of a speech, and to activate the hyperlinks that are associated with the identified terms.

It is another object of the invention to enable an auditor to select during the course of a live speech, one or several terms related to topics drawing his attention and, immediately after said speech or at a later time, to access information related to the topics previously selected.

It is a further object of the invention to enable an auditor of a live speech to access information related to topics that have drawn his attention during the speech with the minimum effort and involvement from his part while minimizing the complexity of the required equipment.

SUMMARY OF THE INVENTION

The present invention is directed to a system, method and computer program as defined in independent claims for enabling an auditor of a live speech to access immediately after or at a later time, complementary information related with terms pronounced during the speech.

The system associates hyperlinks (i.e., URLs) with selected terms or words likely to be pronounce by the speaker in the course of the speech. A speech recognition system operating on a speaker device (i.e., a computing system a with a microphone connected to it) recognizes during the speech (i.e., word spotting) the pronunciation by the speaker of anyone of said hyperlinked terms, and records the time at which each recognized hyperlinked term has been pronounced.

The system is also based on the synchronization of the speaker device with several auditors devices (e.g., workstations, portable computers, personal digital assistants—PDAs, smart phones, or any other type of hand held computing devices) according to a same universal time, so that the flow of information transmitted by the speaker and received by the auditors is always synchronized, independently of the relative positions of the speaker and auditors. Each time the auditor perceives an interesting topic during the speech, he immediately selects the topic simply by pressing a reserved key on the auditor's device. Universal times at which topics are selected by the auditor are stored in the auditor device.

In a preferred embodiment of the invention, the synchronization between speaker and auditor's devices is done referring to an universal time such as the Global Positioning System Time (GPS-time), the Global Orbiting Navigational Satellite System (GLONASS) time or another suitable universal time based on a satellite system. A GPS or GLONASS receiver is integrated or connected to the speaker device. A GPS or GLONASS receiver is integrated or connected to each auditors device. Each auditor device is independent and separate from the radio or television sets used by the auditor to receive the broadcast speech.

More particularly, the present invention discloses a system, method and computer program for generating from a speaker device, a Speech Hyperlink-Time table during a speech, said Speech Hyperlink-Time table being accessible by one or a plurality of auditors. The method comprises the steps of:
  locating and accessing a Speech Hyperlink table comprising:
    means for identifying one or a plurality of predefined hyperlinked terms intended to be pronounced by a speaker;
    means for locating and accessing information related to each of said one or plurality of predefined hyperlinked terms;
  retrieving means for locating and accessing a Speech Hyperlink-Time table;
during the speech:
  recognizing, when they are pronounced by the speaker, the hyperlinked terms predefined in the Speech Hyperlink table by means of a speech recognition system connected to the speaker device;
for each recognized hyperlinked term:
  determining an universal-time corresponding to the pronunciation by the speaker of the recognized hyperlinked term;
  creating a new record on the Speech Hyperlink-Time table;
  copying into said new record:
    the universal-time corresponding pronunciation by the speaker of the recognized hyperlinked term;
    means, retrieved from the Speech Hyperlink table, for identifying the recognized hyperlinked term;
    means, retrieved from the Speech Hyperlink table, for locating and accessing information related to the recognized hyperlinked term.

The present invention also discloses a system, method and computer program for selecting from an auditor device, one or a plurality of hyperlinked terms pronounced by a speaker during the course of a speech, and for accessing, at a later time, information related to each of said one or plurality of selected hyperlinked terms. The method comprises the steps of:
  each time a selection command is received for selecting a term currently pronounced by a speaker during the course of a speech:
    determining the current universal-time;
    recording the current universal-time in a Selections Hyperlink-Time table;
  accessing a Speech Hyperlink-Time table, said Speech Hyperlink-Time table, accessible by one or a plurality of auditor devices, comprising for each one of a plurality of predefined hyperlinked terms pronounced by the speaker:
    an universal-time interval corresponding to the pronunciation of the predefined hyperlinked term;
    means for identifying the predefined hyperlinked term;
    means for locating and accessing information related to the predefined hyperlinked term;
for each universal-time recorded in the Selections Hyperlink-Time table:
  identifying in the Speech Hyperlink-Time table, the selected hyperlinked term pronounced at the recorded universal-time;
  retrieving from the Speech Hyperlink-Time table, said means for identifying and for locating and accessing the selected hyperlinked term;
  storing the retrieved means for identifying the selected hyperlinked term and for locating and accessing information related to the selected hyperlinked term into the Selections Hyperlink-Time table.

Further embodiments of the invention are provided in the appended dependent claims.

The foregoing, together with other objects, features, and advantages of this invention can be better appreciated with reference to the following specification, claims and drawings.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 1 shows how an auditor of a live speech such as a conference perceives topics of interest.

FIG. 2 shows how an auditor perceives topics of interest when listening to a live radio or television program.

FIG. 3 illustrates how, according to the present invention, the speaker workstation and auditors devices are synchronized according to a same universal time, and how a speech recognition system operating on the speaker device, recognizes hyperlinked terms pronounced by the speaker.

FIG. 4 shows how, according to the present invention, the speaker prepares in advance the text of the speech.

FIG. 5 shows how, according to the present invention, the speaker selects in the text of the speech, words or terms for creating hyperlinks (i.e., associate URLs) to multimedia information or services.

FIG. 6 shows, how according to the present invention, the speaker creates a Speech Hyperlink Table that associates to each hyperlinked term, an address to access multimedia information or services.

FIG. 7 shows how, according to the present invention, the speaker the speech recognition system trains before the speech.

FIG. 8 shows how, according to the present invention, during the speech, the speech recognition system operating on the speaker workstation recognizes (i.e., word spots) the hyperlinked terms as they are pronounced by the speaker.

FIG. 9 illustrates how, according to the present invention, when a hyperlinked term is recognized (word spotted) by the speech recognition system, the recognized term, the associated address and the universal time of the recognition are stored as in a Speech Hyperlink-Time Table located on a Speech Server connected to a communications network (e.g., to the Internet).

FIG. 10 shows an example of a Speech Hyperlink-Time Table stored on a Speech Server according to the present invention.

FIG. 11 shows how, according to the present invention, an auditor perceiving a term corresponding to an interesting topic during the course of the speech, selects this term simply by pressing a reserved key on a portable computer.

FIG. 12 illustrates how, according to the present invention, the universal times at which interesting terms are selected by the auditor during the speech, are stored in a Selections Hyperlink-Time Table located in the auditor device.

FIG. 13 shows how, according to the present invention, by connecting the auditor device to the communications network, the auditor updates the Selections Hyperlink-Time Table located in his workstation using the information comprised in the Speech Hyperlink-Time Table stored on the Speech Server.

FIG. 14 shows how, according to the present invention, hyperlinked terms are identified and copied, jointly with the associated Uniform resource Locators (URLs), from the Speech Hyperlink-Time Table stored on the Speech Server to the Selections Hyperlink-Time Table on the auditor device.

FIG. 15 shows how, according to the present invention, an auditor selects from the updated Selections Hyperlink-Time Table an hyperlinked term (corresponding to an interesting topic selected by the auditor during the speech), and activates the associated hyperlink.

FIG. 16 shows how, according to the present invention, multimedia information or services hyperlinked to a selected term is accessed through the communications network and retrieved on the auditor device.

FIG. 17 shows the steps of creating a Speech Hyperlink Table and of training a speech recognition system to identify hyperlinked terms, according to the present invention.

FIG. 18 shows the steps of creating a Speech Hyperlink-Time Table on a Speech Server and of recognizing hyperlinked terms pronounced during a speech, according to the present invention.

FIG. 19 shows the steps of creating a Selections Hyperlink-Time Table on the auditor device and for selecting topics of interest during the course of a speech, according to the present invention.

FIG. 20 shows the steps of retrieving Uniform Resource Locators (URLs) and for having access to the information or services related to selected hyperlinked terms.

PREFERRED EMBODIMENT OF THE INVENTION

As shown in FIGS. 1 and 2, the present invention discloses a system and a method for enabling a spectator (100) of a live event (e.g., attending to a conference) (102) (202), or a radio auditor or television viewer (200) attending a live broadcast program, to select one or several topics (101), (201) drawing his attention or interest, and to immediately or at a later time, to easily have access to multimedia information related with the selected topics (103), (203).

FIG. 1 shows a typical situation according to the present invention. An auditor (100) attending a live speech (e.g., a conference about the subject "Wine & Health"), has his attention drawn by a topic (101) (e.g., the term "Resveratrol") for which he would like to have further information. Under these circumstances, there is a need to provide a simple mechanism to enable an auditor (100) to select topics during the course of a speech (e.g., the terms "Tannis", "Phenols", "Resveratrol"), and to access immediately or at a later time, information related to the selected topics on a server connected, for instance, to the Internet.

FIG. 2 illustrates another typical situation. A television viewer (200) attends a live broadcast speech (e.g., to a live television program about the subject "Wine & Health").

As shown in FIG. 3, hyperlinks (i.e., URLS) (303) are associated with terms or words (304) likely to be cited by the speaker (301) in the course of his speech. These hyperlinked terms or words are related to relevant topics or items (302). A speech recognition system (305) operating on a speaker workstation (306) (i.e., a computing system a with a microphone (307) connected to it) detects during the speech, the pronunciation by the speaker of anyone of said hyperlinked terms (308), and records the time (309) at which the detected hyperlinked term has been pronounced. The system is also based on the synchronization (312) of the speaker device (306) with several auditors devices (311) (e.g., workstations, portable computers, personal digital assistants—PDAs, smart phones, or any other type of hand held computing devices) according to a same universal time (309) (310), so that the flow of information transmitted by the speaker (301) and received by the auditors (300) is always synchronized, independently of the relative positions of speaker (301) and auditors (300). Each time an auditor (300) perceives an interesting topic (313) during the speech, he immediately selects this topic simply by pressing a reserved key (314) on the auditor's device (311). Universal times (310) at which topics are selected (314) by the auditor (300) are stored on the auditor device (311).

As shown in FIG. 3, the invention is based on the following principles:
1. the synchronization—independently of the relative positions of the speaker (301) and auditors (300)—of the speaker workstation (306) and auditors devices (311) according to a the same universal time (312) (e.g., the GPS time, as provided by GPS receivers (309), (310), and
2. the detection by means of a speech recognition system (305) operating on the speaker workstation (306) (with a microphone connected to it) of hyperlinked terms (304) (e.g., "Resveratrol" (308)) pronounced by the speaker (301) during the course of the speech (302).

Universal Timing Systems

Common timing sequences, independent of locations of speakers and auditors, can be derived from an absolute timing reference such as, for example, the Global Positioning System (GPS) time or the Universal Time Co-ordinated (UTC) time (also known today as GMT and ZULU time).

To transmit precise timing signals, the GPS uses 24 satellites in 55° inclined orbits 10,000 miles above the earth. These timing signals are used by any GPS receiver anywhere on the earth to determine its position. A 1575 MHz transmission carries a 1-MHz bandwidth phase-modulated signal named the clear acquisition (C/A) code. When a GPS receiver receives this signal from at least three GPS satellites. it can determine its own latitude and longitude with an accuracy of about 30 meters. Apart the determination of geographical positions, the GPS is today widely used for distributing Precise Time and Time Interval (PTTI). The system uses time of arrival (TOA) measurements for determining a position. A precisely timed clock is not essential for the user because time is obtained in addition to position by the measurement of the TOA of four satellites simultaneously in view. If the altitude over sea level is known, three satellites are sufficient. If the user is stationary at a known position then, in principle, the time can be obtained by the observation of a single satellite. Information about the GPS time service is supplied by the "Time Service Department", U.S. Naval Observatory, Washington, D.C., at http://tycho.usno.navy.mil/.

GPS is today the world's principal supplier of accurate time. It is used extensively both as a source of time and as a means of transferring time from one location to another. Three kinds of time are available from GPS: GPS time, UTC as estimated and produced by the United States Naval Observatory, and the times from each free-running GPS satellite's atomic clock. The Master Control Station (MCS) at Falcon Air Force Base near Colorado Springs, Colo., gathers the GPS satellites' data from five monitor stations around the world. A Kalman filter software program estimates the time error, frequency error, frequency drift and Keplerian orbit parameters for each of the satellites and its operating clock. This information is uploaded to each satellite so that it can be broadcast in real time. This process provides GPS time consistency across the constellation to within a small number of nanoseconds and accurate position determination of the satellites to within a few meters.

The second universal time standard, Universal Time Coordinated (UTC), introduces leap seconds to remain synchronized with the rotation of the earth. In order to provide an estimate of UTC time derivable from a GPS signal, a set of UTC corrections is also provided as part of the GPS broadcast signal. This broadcast message includes the time difference in whole seconds between GPS time and UTC. This complicates software that deals with the smooth flow of data streams or calculates the times between data samples. GPS Time is preferred in this invention as this system avoids the introduction of leap seconds and is easily related to UTC. Information about UTC (GMT) time service can be found on: http://time.greenwich2000.com/.

GPS Receivers A Direct-to-Digital GPS Receiver is described in the following Web site: http://w3.research.ibm.com/present/gto200038.htm.

This is an example of a tiny low cost chip which can integrate GPS into anything (e.g., a PDA, a mobile phone, a wearable computer, a video camera) . This receiver has been jointly developed between IBM and Leica. The high speed analog capabilities of SiGe technology, when integrated with the CMOS technology, allows the integration of this single chip directly to a digital GPS (Global Positioning System) receiver. GPS derived position information is finding a multitude of diverse applications: from mapping and surveying to vehicle tracking to 911 cell phone caller location to automated farm equipment to even robotics golf carts . . . This receiver chip reduces the radio dimensions and complexity. There are no analog mixer stages, nor costly discrete components (such as high quality filters) that conventional two stage analog down conversion would have required. Instead, the incoming GPS signal is literally digitized right at the antenna, then filtered digitally in a CMOS based chip. This direct digitization is made possible by the ability of SiGe technology to run high speed on very little power, and the core of this technology is a SiGe based Analog to Digital Data Converter.

According to the present invention GPS or GLONASS receivers must be integrated or connected to the speaker workstation (typically a Personal Computer) and to auditor's devices (e.g., Personal Computers, wearable computers, Personal Digital Assistants (PDAs), smart phones or onboard mobile computers). The universal timing signals that are received from GPS or GLONASS satellites, are used to initialize and synchronize the internal electronic clocking systems on the speaker workstation and auditor's devices according to the same universal time. During the periods on which GPS or GLONASS satellites are out of sight (e.g., when speaker or auditor's devices are inside buildings or not connected to an external antenna), and no timing signals are thus received from those satellites, timing information must be continuously derived from the autonomous electronic clocking systems. Depending on the drift of the internal clocking systems, and to keep enough timing precision and to be sure that user's devices are synchronized with speaker's workstations and broadcasting stations at the same universal time, a more or less frequent periodic reception of satellite signals must be performed. In practice,
  if the user device is a portable or in-vehicle mounted device, satellite signals will be received when the user is out of doors or is traveling.
  If the user device is fixed or installed in a house or building during long periods, the user device must be connected to an outdoors installed GPS or GLONASS antenna, (e.g., antenna installed on the roof of the building).

Systems and Methods for Detecting Words in a Continuous Speech

Speech recognition is the process by which a computer (or other type of system or apparatus) identifies spoken words. Basically, a speech recognition system is a computer which can correctly recognize what a speaker is saying.

The speech recognition is an extremely difficult task. Unlike written text, no clear spacing exists between spoken words. Full sentences or sentences are typically pronounced without any pause. Furthermore, the acoustic variability in the speech signal typically precludes an unambiguous mapping to a sequence of words or subword units, such as pronunciations of consonants and vowels. A major source of variability in speech is coarticulation, or the tendency for the acoustic characteristics of a given speech sound or phone sound to differ depending upon the phonetic context in which it is produced.

Speech recognition systems can be categorized depending on the speaking styles, the vocabularies, and language models they accommodate. Isolated word recognizers require speakers to insert brief pauses between individual words. Continuous speech recognizers operate on fluent speech, but typically employ strict language models, or grammars, to limit the number of allowable word sequences.

Word spotters are a particular kind of speech recognizers. They operate also on fluent speech. However, rather than providing a full transcription, word spotters selectively locate relevant words or sentences. Word spotting is useful to retrieve information based on keyword indexing or to recognize isolated words in voice command applications.

Multiple speech recognition systems are today available with the word spotting capability required to support the present invention. These systems allow the detection of pre-defined words or sentences (hyperlinked terms) that may be pronounced by a speaker in the course or a speech. Such speech recognition systems are, for instance, described in the following patents:

U.S. Pat. No. 5,199,077 entitled "Wordspotting for voice editing and indexing", discloses a technique for wordspotting based on hidden Markov models (HMM's). The technique allows a speaker to specify keywords dynamically and to train the associated HMM's via a single repetition of a keyword. Non-keyword speech is modeled using an HMM trained from a prerecorded sample of continuous speech. The wordspotter is intended for interactive applications, such as the editing of voice mail or mixed-media documents, and for keyword indexing in single-speaker audio or video recordings.

U.S. Pat. No. 5,425,129, entitled "Method for word spotting in continuous speech", discloses a system and method for analyzing a digitized speech data channel for the presence of words or sentences from a desired list. The system and method of this invention, that has been implemented in the context of the IBM Continuous Speech Recognition System (ICSRS), provides in a speech recognition system a subsystem for spotting those pre-specified words or sentences in the presence of unrelated phonetic data.

U.S. Pat. No. 5,950,159 entitled "Word spotting using both filler and phone recognition" discloses a word-spotting system and a method for finding a keyword in acoustic data. The method includes a filler recognition phase and a keyword recognition phase wherein: during the filler recognition phase the acoustic data is processed to identify phones and to generate temporal delimiters and likelihood scores for the phones; during the keyword recognition phase, the acoustic data is processed to identify instances of a specified keyword including a sequence of phones; wherein the temporal delimiters and likelihood scores generated in the filler recognition phase are used in the keyword recognition phase.

U.S. Pat. No. 6,006,185 entitled "System and device for advanced voice recognition word spotting" discloses a speaker independent, continuous speech, word spotting voice recognition system and method. The edges of phonemes in an utterance are quickly and accurately isolated. The utterance is broken into wave segments based upon the edges of the phonemes. A voice recognition engine is consulted multiple times for several wave segments and the results are analyzed to correctly identify the words in the utterance.

U.S. Pat. No. 6,073,095 entitled "Fast vocabulary independent method and apparatus for spotting words in speech" discloses a fast, vocabulary independent method, for spotting words in speech by utilizing a preprocessing step and a coarse-to-detailed search strategy for spotting a word/phone sequence in speech.

U.S. Pat. No. 6,185,527 entitled "System and method for automatic audio content analysis for word spotting, indexing, classification and retrieval" discloses a system and method for indexing an audio stream for subsequent information retrieval.

U.S. Pat. No. 6,230,126 entitled "Word-spotting speech recognition device and system" discloses a device for speech recognition which includes a dictionary which stores features of recognition objects. The device further includes a matching unit which compares features of input speech with the features of the recognition objects, and a dictionary updating unit which updates time lengths of phonemics in the dictionary based on the input speech when the matching unit finds substantial similarities between the input speech and one of the recognition objects.

A fundamental problem with speech recognition systems is the unreliable behavior of the state-of-the-art technology for performing "word spotting" (i.e., identification of pre-specified keywords or terms) in a continuous mode, independently of the speaker, based on unknown or generic speaking styles, vocabularies, noise levels and language models. On the contrary, the automatic word spotting function required for the present invention is relatively easy to implement since the system can be trained and tuned in advance by the speaker using his own voice, his specific speaking style and a specifically adapted vocabulary and language model.

According to one aspect of the invention, a system and a method is disclosed for creating hyperlinks from pre-selected utterances (304) (commonly spoken words, terms or sentences) intended to be pronounced by a speaker (301) during a speech (302), to related relevant data (303) on the Web, and for training a speech recognition system (305) to identify (word spot) said hyperlinked terms (304).

According to another aspect of the invention, a system and a method is disclosed for automatically recognizing (word spotting) the hyperlinked terms (304) as they are pronounced by a speaker (301) during a live speech, and for creating on a network server a table comprising a list of recognized hyperlinked terms (304), the associated network addresses (i.e., the URLs) (303) and the universal times (309) corresponding to the recognition of these hyperlinked terms.

According to a further aspect of the invention, a system and a method is disclosed for recording on an auditor device (311) universal times (310) corresponding to a selection (314) by an auditor (300) during the course of a speech (302), of one or several interesting topics (313).

According to another aspect of the invention, a system and a method is disclosed for enabling an auditor (300) to access and retrieve from a server connected to a computer network, relevant information related to an hyperlinked term (304).

Method for Creating a Speech Hyperlink Table and for Training a Speech Recognition System with the Vocabulary of Hyperlinked Terms As shown in FIG. 17, the invention discloses a system, method and computer program for use in by a speaker (301) before a speech, for creating hyperlinks from selected utterances (304) (commonly spoken words or sentences) intended to be pronounced by a speaker (301) during a speech (302), to related relevant data (303) on one or several servers connected to a computer network preferably the Web, and for training a speech recognition system (305) for word spotting the speech with the vocabulary of said hyperlinked terms (304). The method comprises the steps of:

during the production or edition of the speech:
- (1701) editing the text or a draft text (400) of the speech;
- (1702) selecting and marking on the speech text (500) a plurality of relevant terms. or words (501) for which hyperlinks must be created;
- (1703) creating a Speech Hyperlink Table (600) for the speech;

defining hyperlinks in the Speech Hyperlink Table (600) between the selected terms or words (501) and multimedia information or services located on one or a plurality of servers (909) connected to a computer network (908), said step comprising the further steps of:

for each one of the selected hyperlinked terms or words (501):
- (1704) assigning a name and/or a description (601) (preferably a brief description);
- (1705) assigning a destination address (602) (for instance the URL) within the network (908) to access the desired multimedia information or service;
- (1706) storing in the Speech Hyperlink Table (600) the assigned name (or description) (601) and/or the destination address (602); and once hyperlinks have been defined in the Speech Hyperlink Table (600):
- (1707) training a speech recognition system (701) running on the speaker workstation (702) with the vocabulary of the hyperlinked terms (602), (703) for automatically recognizing these hyperlinked terms when they will be pronounced by the speaker (700) during the speech.

FIG. 4 shows the text (400) of an exemplary speech (e.g., a conference about the subject "Wine & Health"), to be perform in a conference room or to be broadcast at the radio or television. During the live speech, this text can be read in its entirety by the speaker (301) or the speaker can intentionally omit to read of some parts, change the order, or introduce alternative or additional comments at convenience.

FIG. 5 illustrates how a speaker, a program editor (or any person committed do to it) takes the speech text (500) and selects certain terms (501) (words or sentences, such as "Phenols", "Resveratrol", "Tannins", "Ellagic acid", "Hydroxycinnamates", "Free radicals", "Anthocyanin", "Gallic acid") to associate additional information accessible on the Web. Each of these selected terms named hyperlinked terms, must be associated to a network address (i.e., to the corresponding URL) on the Web from where the related information or service can be retrieved.

FIG. 6 shows how the speaker, the program editor (or any person committed do to it) creates on the speaker workstation (306) a Speech Hyperlink Table (600) that associates with each selected hyperlinked term (601) (i.e., selected word or sentence on the speech text, e.g., "Resveratrol"), a corresponding URL on the Web (602) (e.g., http://www.ag.uiuc.edu/~ffh/resvera.html)

FIG. 7 shows how, before the speech, the speaker (700) trains with the vocabulary of hyperlinked terms (703) (e.g., "Phenols", "Resveratrol", Tannis", . . . ) a speech recognition system (701) with word spotting capability installed on his workstation (702). In a particular embodiment of the invention, the word spotting function is implemented by means of the IBM Continuous Speech Recognition System—ICSRS—running on the IBM ViaVoice software product.

Method for Recognizing Hyperlinked Terms During a Speech and for Creating a Speech Hyperlink-Time Table on a Speech Server As shown in FIG. 18, the invention also discloses a system, method and computer program for use in a speaker workstation (802) for recognizing hyperlinked terms (803) as they are pronounced by the speaker (800) during a live speech, for creating on a Speech Server (907) connected to a network (908), a Speech Hyperlink-Time Table (906), and for updating this table with records comprising the sequence (905) of the recognized hyperlinked terms (304), the corresponding network addresses (i.e., the URLs) (303) and the universal times (309) when these hyperlinked terms have been recognized. More particularly, the method comprises the steps of:
- (1801) creating a Speech Hyperlink-Time Table (906) for the speech on a Speech Server (907) connected to a network (908); and during the speech:
- (1802) "word spotting" the speech to recognize the pronunciation by the speaker (800) of hyperlinked terms (803) by means of a speech recognition system (801) running on the speaker workstation (802) and purposely trained for the speech; and;

for each hyperlinked term (803) that has been recognized:
- (1803) determining by means of an universal time device, the universal time (904) corresponding to the recognition of the hyperlinked term (903);
- (1804) creating a record including:
  - the universal time (904) when the hyperlinked term (903) has been recognized;
  - the name or short description (601) of the recognized hyperlinked term (803) using the Speech Hyperlink Table (600); and
  - the network address (1005) (i.e., the URL) corresponding to the recognized hyperlinked term (803) using the Speech Hyperlink Table (600);
- (1805) storing the record in the Speech Hyperlink-Time Table (906), (1000) stored on the Speech Server (907) accessible through the network (908) from the speaker workstation (902).

FIG. 8 illustrates how, while the speaker (800) is pronouncing his speech, the "word spotting" function running on the speech recognition system (801) installed on the speaker workstation (802) (e.g., implemented by means of the IBM Continuous Speech Recognition System—ICSRS—running on the IBM ViaVoice software product) and previously trained by the speaker, automatically detects the hyperlinked terms (803) from the voice stream.

FIG. 9 shows how, after recognition of the hyperlinked term (903) (e.g., "Resveratrol") by means of the speech recognition system (901) running on the speaker workstation (902),
- the universal time (904) (e.g., Dec. 5, 2001 14:23:18) corresponding to the recognition of the hyperlinked term (903);
- the hyperlinked term name or short description (601) (e.g., "Resveratrol"); and
- the associated URL (602) (e.g., http://www.ag.uiuc.edu/~ffh/resvera.html; (last both extracted from the Speech Hyperlink Table (600) are sent (905) and stored on a Speech Hyperlink-Time Table (906) located on a Speech Server (907).

FIG. 10 shows an example of a Speech Hyperlink-Time Table (1000) (906) stored on the Speech Server (907) as it appears at the end of the speech (e.g., about the subject "Wine & Health" (1001)). The header of this table comprises the URL (1002): http://www.directbuyer.com/conference-0173.htm/ or network address where the Speech Hyperlink-Time Table (1000) has been stored in the Speech Server (907) (e.g., www.directbuyer.com). The URL where the Speech Hyperlink-Time Table (1000) can be found in the network, must be known in advance by the auditors. Each row in this table corresponds to a hyperlinked term (903) pronounced by the speaker and recognized by the speech recognition system (901) during the speech. Each column corresponds, respectively to:
- (1003) the universal time corresponding to the recognition of a spoken hyperlinked term (903) by the Speech Recognition System (901) during the speech;
- (1004) the name and/or short description (601) of the recognized hyperlinked (903) term copied from the Speech Hyperlink Table (600);
- (1005) the URL (602) corresponding to the recognized hyperlinked term (903), copied from the Speech Hyperlink Table (600).

Method for Creating a Selections Hyperlink-Time Table and for Selecting Topics of Interest As illustrated by FIG. 19, the invention discloses also a system, method and computer program for creating a Selections Hyperlink-Time Table (1106) on an auditor device (1102) and for recording in this table a sequence of universal times (1105) corresponding to the selection (1104) by an auditor (1100) of interesting topics (1103) during the speech, for the purpose of, immediately after the speech or at a later time, receiving further information related to these topics. More particularly, the method for use in the auditor device, comprises the steps of:
- (1901) creating a Selections Hyperlink-Time Table (1200) on the auditor device (1102);
- (1902) recording on the Selections Hyperlink-Time Table (1200) the network address (i.e., the URL) (1201) of the Speech Hyperlink-Time Table (906) stored on the Speech Server (907);
- (1903) listening to the speech (1107) pronounced by the speaker (1101);
- (1904) perceiving in the speech, a topic of interest (1103) for which additional information or service is desired;
- (1905) selecting this topic of interest (1103) by entering a selection command (1104) on the auditor device (1102);
- (1906) determining the current universal time (1105) by means of an universal time device (for instance a GPS receiver) integrated or connected to the auditor device;
- (1907) recording this current universal time (1105) in the Selections Hyperlink-Time Table (1106), (1202).

FIG. 11 illustrates how during the speech, the auditor (1100) operates using a portable auditor device (1102) in stand-alone mode (i.e., isolated, not connected to a network). According to the particular embodiment detailed in FIG. 11, each time the auditor (1100) perceives during the speech an interesting topic (1103), he immediately selects this topic simply by pressing a reserved key (1104) on the auditor device (1102). Universal times (1105) corresponding to the selection of the topics by the auditor, are stored in the Selections Hyperlink-Time Table (1106) on the auditor device (1102).

FIG. 12 shows a typical Selections Hyperlink-Time Table (1200) created on the auditor device (1102) during the speech. Each row in this table corresponds to a selection by the auditor of an interesting topic during the speech. The header of this table comprises the URL (1201) (e.g., http.//lwww.directbuyer-.com/conference-0173.html ) of the Speech Hyperlink-Time Table (906),(1000) corresponding to the speech. The Speech Hyperlink-Time Table (906),(1000) on the Speech Server (907) (e.g., www.directbuyer.com), is updated during the speech from the speaker workstation (902). As it has been said before, the URL of the Speech Server must be provided in advance to the auditors to allow them to create locally a Selections Hyperlink-Time Table (1200).

Method for Retrieving Hyperlinks and for Accessing Information

As illustrated by FIG. 20, the invention discloses also a system, method and computer program for enabling an auditor (300) to access and retrieve from the Web relevant data or information related with the hyperlinked terms (304) that were active when the auditor made the corresponding selections (314). More particularly, the method for use on the auditor device (1300), comprises the steps of:
- (2001) accessing the Speech Server (1303);

for each universal time (1202) recorded in the Selections Hyperlink-Time Table 1304), (1200) located on the auditor device (1300):
- (2002) sending (1306) to the Speech Server (1303) the recorded universal time;
- (2003) identifying in the Speech Hyperlink-Time Table (1302), (1000) located on the Speech Server (1303), the hyperlinked term (1004) associated with said universal time (1306) (hyperlinked term that was active at that universal time);
- (2004) retrieving (1307) from the Speech Hyperlink-Time Table (1302), (1000) located in the Speech Server (1303) the name (or description) (1004) and the destination address (URL) (1005) of the selected hyperlinked term;
- (2005) storing the retrieved hyperlink name and destination address (URL) (1307) into the Selections Hyperlink-Time Table (1304), (1402) located on the auditor device (1300);

The method includes the further steps of:
- (2006) selecting in the Selections Hyperlink-Time Table (1502), an hyperlink (1501) using the hyperlink name (or description) or the associated destination address retrieved from the Speech Server (1507);
- (2007) activating said hyperlink (1501) using a browser program running on the auditor device (1500);
- (2008) accessing the information and/or service located on a server (1506) connected to the network (1505) using the retrieved destination address (1503) (1504) associated with the selected hyperlink (1501);
- (2009) retrieving (1601) the information and/or service (1604) from the accessed server (1603) on the network (1602);
- displaying, on the auditor device (1600), the retrieved information and/or service (1604) using a browser program FIG. 13 illustrates how, by connecting the portable device (1300) of the auditor (1100) to the communications network (1301) (e.g., the Internet network) and by accessing the Speech Hyperlink-Time Table (1302) on the Speech Server (1303), the information on the Selections Hyperlink-Time Table (1304) of the auditor device (1300) is updated.

FIG. 14 illustrates in detail the process for updating the Selections Hyperlink-Time Table (1400) on the auditor device (1300) using the Speech Hyperlink-Time Table (1401), (1302) on the Speech Server (1303). Basically, by means of this process, the hyperlinked terms (or short names and/or short descriptions) and the URLs of the hyperlinked terms that were active at the universal times (1403) when the auditor has selected interesting topics, are identified in the Speech Hyperlink-Time Table (1401) located on the Speech Server (1303) and are copied into the Selections Hyperlink-Time Table (1402) located on the auditor device (1300).

FIG. 15 illustrates how the auditor selects and get access from the auditor device (1500) to Web pages hyperlinked to the topics he has selected during the speech. Basically, the auditor points to and selects a hyperlinked term (1501) on the updated Selections Hyperlink-Time Table (1502) and, by means of a software on the auditor device (1500), activates a Web browser and triggers the hyperlink to the URL (1503) of the selected item (1501). In the example shown in this figure, the auditor selects the hyperlinked term "Ellagic acid", (in fact a chemical compound found in wines), and triggers the hyperlink pointing to the URL (1504): http://www.hopeforcancer.com/ellagicacid.htm FIG. 16 shows how the Web page (1601), (e.g., document: ellagicacid.htm), associated with the selected hyperlinked term (1501), (e.g., "Ellagic acid"), is received through the network (1602) from the accessed Web server (1603) (e.g., http//www.hopeforcancer.com), and displayed (1604) or played on the auditor device (1600).

While the invention has been particularly shown and described with reference to a preferred embodiment, it will be understood that various changes in form and detail may be made therein without departing from the spirit, and scope of the invention.

What is claimed is:

1. A method for generating a Speech Hyperlink-Time table in conjunction with a system of universal time that provides a same absolute time for every geographical location on Earth, said method comprising:

creating a Speech Hyperlink table structured with columns and rows, wherein the columns of the Speech Hyperlink table consist of a column for storing hyperlinked terms, a column for storing universal times at which corresponding hyperlinked terms are recognized, and a column for storing network addresses linking corresponding hyperlinked term and a corresponding network address of a network, wherein the Speech Hyperlink table comprises a plurality of entries, wherein each entry of the plurality of entries corresponding to a row of the Speech Hyperlink table and comprises a hyperlinked term and a corresponding network address of the network, wherein said network address links the hyperlinked term to information relating to the hyperlinked term, wherein said information is on a server of the network; and while a speech is being spoken by a speaker, recognizing each hyperlinked term of the Speech Hyperlink table being spoken by the speaker, said recognizing being performed by a speech recognition system on a computing device, and for each recognized hyperlinked term:
determining a universal time at which the hyperlinked term was recognized;
ascertaining, from the Speech Hyperlink table, a network address that corresponds to the recognized hyperlinked term; and
generating a row in the Speech Hyperlink-Time table, wherein said row comprises the universal time, the recognized hyperlinked term, and the network address that corresponds to the recognized hyperlinked term.

2. The method of claim 1, wherein the system of universal time is selected from the group consisting of a system of Global Positioning System (GPS) time, a system of Universal Time Co-ordinated (UTC) time, a system of Greenwich Mean Time (GMT), and a system of time derived from a free-running atomic clock of a GPS satellite.

3. The method of claim 1, said determining the universal time comprising determining the universal time by a Global Positioning System (GPS) receiver.

4. The method of claim 1, said providing the Speech Hyperlink table comprising:
selecting the hyperlinked terms from a text of the speech; and
for each selected hyperlinked term: identifying a network address corresponding to the selected hyperlinked term and storing, in the Speech Hyperlink table, an entry comprising the selected hyperlinked term and its identified corresponding network address.

5. The method of claim 1, wherein the network is an Internet, wherein the network address is a Universal Resource Locator (URL), wherein the information is a web page, and wherein the server is a web server.

6. The method of claim 1, said method further comprising prior to said recognizing: training the speech recognition system to recognize the hyperlinked terms as the hyperlinked terms are pronounced during the speech.

7. The method of claim 1, wherein the speech is comprised by a radio program or a television program.

8. The method of claim 1, said determining, ascertaining, and generating being performed by the computing device.

9. A method for processing a speech in conjunction with a system of universal time that provides a same absolute time for every geographical location on Earth, said method comprising:

entering at least one selection command on an auditor device, said auditor device being a computing device, each selection command entered in real-time response to a spoken hyperlinked term of the speech, each spoken hyperlinked term appearing in a record of a plurality of records of a Speech Hyperlink-Time table comprised by a speech server, each record of the Speech Hyperlink-Time table comprising a hyperlinked term of the speech, a universal time at which the hyperlinked term was spoken during the speech, and a network address linking the hyperlinked term to information relating to the hyperlinked term, said information being on a server of a network; and for each selection command entered: determining a universal time at which the selection command was entered and recording the determined universal time in a record of a Selections Hyperlink-Time table comprised by the auditor device.

10. The method of claim 9, said auditor device being coupled to the speech server through the network, said method further comprising selecting at least one universal time from the Selections Hyperlink-Time table and for each selected universal time:
sending the selected universal time to the speech server;
receiving from the speech server a hyperlinked term and its associated network address appearing in a record of the Speech Hyperlink-Time table whose included universal time is closest to the selected universal time and does not exceed the selected universal time; and
storing the received hyperlinked term and its associated network address in a record of the Selections Hyperlink-Time table that comprises to the selected universal time.

11. The method of claim 10, wherein the Speech Hyperlink table is structured with columns and rows, wherein the columns of the Speech Hyperlink table consist of a column for storing hyperlinked terms, a column for storing universal times at which corresponding hyperlinked terms are recognized, and a column for storing network addresses linking corresponding hyperlinked term and a corresponding network address of the network, and wherein each record of the Speech Hyperlink-Time table consists of a row of the Speech Hyperlink-Time table.

12. The method of claim 10, said method further comprising:

selecting a record of the Selections Hyperlink-Time table;

using a network address in the selected record to link to information relating to a hyperlinked term in the selected record;

retrieving the information from a server of the network that comprises the information; and displaying the retrieved information on the auditor device.

13. The method of claim 9, wherein the system of universal time is selected from the group consisting of a system of Global Positioning System (GPS) time, a system of Universal Time Co-ordinated (UTC) time, a system of Greenwich Mean Time (GMT), and a system of time derived from a free-running atomic clock of a GPS satellite.

14. The method of claim 9, said determining the universal time comprising determining the universal time by a Global Positioning System (GPS) receiver at the auditor device.

15. The method of claim 9, wherein the network is an Internet, wherein the network address is a Universal Resource Locator (URL), wherein the information is a web page, and wherein the server is a web server.

16. The method of claim 9, wherein the speech is comprised by a radio program or a television program.

17. The method of claim 9, said entering, determining, and recording being performed the auditor device.

18. The method of claim 9, wherein the auditor device is selected from the group consisting of a workstation, a portable computer, a personal digital assistant (PDA), a smart phone, and any other type of hand held computing device.

19. The method of claim 9, wherein the Speech Hyperlink table is structured with columns and rows, wherein the columns of the Speech Hyperlink table consist of a column for storing hyperlinked terms, a column for storing universal times at which corresponding hyperlinked terms are recognized, and a column for storing network addresses linking corresponding hyperlinked term and a corresponding network address of the network, and wherein each record of the Speech Hyperlink-Time table consists of a row of the Speech Hyperlink-Time table.

* * * * *

UNITED STATES PATENT AND TRADEMARK OFFICE
CERTIFICATE OF CORRECTION

PATENT NO.         : 7,505,907 B2                                              Page 1 of 1
APPLICATION NO.    : 10/528175
DATED              : March 17, 2009
INVENTOR(S)        : Fernando Incertis Carro It is certified that error appears in the above-identified patent and that said Letters Patent is hereby corrected as shown below:

On the Title Page

Item (12) United States Patent should read,

Incertis Carro

Signed and Sealed this
Tenth Day of September, 2013

Teresa Stanek Rea
*Acting Director of the United States Patent and Trademark Office*